(12) United States Patent
Danley et al.

(10) Patent No.: US 7,152,627 B2
(45) Date of Patent: Dec. 26, 2006

(54) CONTROL VALVE FOR A HYDRAULIC POWER STEERING SYSTEM

(75) Inventors: David M. Danley, Hanover, PA (US); Kenneth C. Giurlando, Lancaster, PA (US); Jeffrey E. Tippton, Gettysburg, PA (US)

(73) Assignee: R. H. Sheppard Co., Inc.

( * ) Notice: Subject to any disclaimer, the term of this patent is extended or adjusted under 35 U.S.C. 154(b) by 470 days.

(21) Appl. No.: 10/818,005

(22) Filed: Apr. 5, 2004

(65) Prior Publication Data
US 2005/0217739 A1     Oct. 6, 2005

(51) Int. Cl.
*B52D 5/083*     (2006.01)

(52) U.S. Cl. .......................... 137/625.23; 137/625.24; 251/283; 91/375 A

(58) Field of Classification Search ........... 137/625.21, 137/625.22, 625.23, 625.24; 251/283; 91/375 A, 91/375 R; 180/417, 441
See application file for complete search history.

(56) References Cited

U.S. PATENT DOCUMENTS

| 2,406,173 | A | * | 8/1946 | Stephens ................... 91/375 R |
| 2,907,349 | A | * | 10/1959 | White .................... 137/625.23 |
| 3,022,772 | A | | 2/1962 | Zeigler et al. ................. 121/41 |
| 3,896,702 | A | | 7/1975 | Shah et al. ................ 91/375 A |
| 4,335,749 | A | | 6/1982 | Walter .................... 137/625.22 |
| 4,365,683 | A | | 12/1982 | Adams ........................ 180/132 |
| 4,460,016 | A | | 7/1984 | Haga et al. ............. 137/625.24 |
| 4,461,321 | A | | 7/1984 | Bacardit ................. 137/625.21 |
| 4,471,808 | A | | 9/1984 | Thomsen et al. ...... 137/625.32 |
| 4,471,809 | A | | 9/1984 | Thomsen et al. ...... 137/625.32 |
| 4,558,720 | A | | 12/1985 | Larson et al. .......... 137/625.24 |
| 4,565,115 | A | | 1/1986 | Bacardit .................... 91/375 A |
| 4,577,660 | A | | 3/1986 | Haga et al. ............ 137/625.24 |
| 4,624,283 | A | * | 11/1986 | Futaba ................... 137/625.24 |
| 4,678,052 | A | | 7/1987 | Suzuki et al. ................ 180/143 |
| 4,733,690 | A | | 3/1988 | Brunner ................... 137/513.7 |
| 4,771,841 | A | | 9/1988 | Uchida et al. ............... 180/142 |
| 4,836,249 | A | * | 6/1989 | LaPointe ............... 137/625.23 |
| 4,848,402 | A | | 7/1989 | Elser et al. ............ 137/625.23 |
| 4,852,462 | A | | 8/1989 | Uchida et al. ............ 91/375 A |
| 4,860,635 | A | | 8/1989 | Uchida et al. ............ 91/375 A |
| 4,884,648 | A | | 12/1989 | Uchida et al. ............... 180/142 |
| 4,924,910 | A | | 5/1990 | Tabata et al. ........... 137/625.23 |
| 4,942,803 | A | | 7/1990 | Rabe et al. .................... 91/370 |
| 5,207,244 | A | | 5/1993 | Behrens et al. ........ 137/625.24 |
| 5,230,273 | A | | 7/1993 | Fraley, Jr. .................... 91/371 |
| 5,255,715 | A | | 10/1993 | Phillips ................. 137/625.23 |
| 5,259,413 | A | | 11/1993 | Harpole et al. ........ 137/625.24 |
| 5,263,512 | A | | 11/1993 | Emori et al. ........... 137/625.23 |

(Continued)

*Primary Examiner*—John Rivell
(74) *Attorney, Agent, or Firm*—Hooker & Habib, P.C.

(57) ABSTRACT

A control valve for a hydraulic power steering system includes a pair of flow circuits arranged in parallel. Each flow circuit includes an upstream and downstream flow orifices arranged in series. Each set of orifices defines between the orifices an intermediate pressure zone of the valve. Both orifices close together from a centered condition of the valve and fully close substantially together at a fully closed condition of the valve. The downstream orifice is larger than the upstream orifice when open to minimize the likelihood of cavitation and noise. An equalization passage fluidly connects both intermediate pressure zones to equalize pressure despite variations in orifice size due to manufacturing tolerances. The control valve includes a bypass passage in parallel with the flow circuits. A pressure relief valve in the control valve has a normally closed valving member in the bypass passage that opens the valve in the event of overpressure.

86 Claims, 17 Drawing Sheets

U.S. PATENT DOCUMENTS

| | | |
|---|---|---|
| 5,417,244 A | 5/1995 | Behrens et al. ........ 137/625.23 |
| 5,447,209 A | 9/1995 | Sasaki et al. ............... 180/132 |
| 5,458,153 A | 10/1995 | Roeske .................. 137/625.24 |
| 5,542,338 A | 8/1996 | Rupp ....................... 91/375 R |
| 5,562,124 A | 10/1996 | Behrens et al. ........ 137/625.23 |
| 5,582,207 A | 12/1996 | Gilbert et al. ......... 137/625.23 |
| 5,638,912 A | 6/1997 | Haga et al. ................. 180/417 |
| 5,645,107 A | 7/1997 | Kobayashi et al. .... 137/625.23 |
| 5,690,143 A | 11/1997 | Birsching ............. 137/625.23 |
| 5,794,507 A | 8/1998 | Strong ...................... 91/375 A |
| 5,845,737 A | 12/1998 | Suzuki et al. ............... 180/441 |
| 5,870,941 A | 2/1999 | Spillner et al. .......... 91/375 A |
| 5,878,780 A * | 3/1999 | Thomas ................ 137/625.23 |
| 5,881,771 A | 3/1999 | Thomas ................ 137/625.23 |
| 5,934,405 A | 8/1999 | Place .......................... 180/441 |
| 5,937,728 A | 8/1999 | Strong ...................... 91/375 A |
| 5,975,137 A | 11/1999 | Strong .................. 137/625.23 |
| 5,996,626 A | 12/1999 | Thomas ................ 137/625.23 |
| 6,082,403 A | 7/2000 | Strong .................. 137/625.23 |
| 6,089,270 A | 7/2000 | Roeske .................. 137/625.22 |
| 6,240,961 B1 | 6/2001 | Strong .................. 137/625.23 |
| 6,349,788 B1 | 2/2002 | Wang et al. ................. 180/421 |
| 6,481,461 B1 | 11/2002 | Habermann et al. ........ 137/596 |
| 7,025,091 B1 | 4/2006 | Wang .................... 137/625.63 |
| 2005/0109408 A1 | 5/2005 | Wang .................... 137/625.21 |
| 2005/0284687 A1 | 12/2005 | Sano .......................... 180/441 |
| 2006/0169520 A1 | 8/2006 | Miyazaki .................... 180/417 |

* cited by examiner

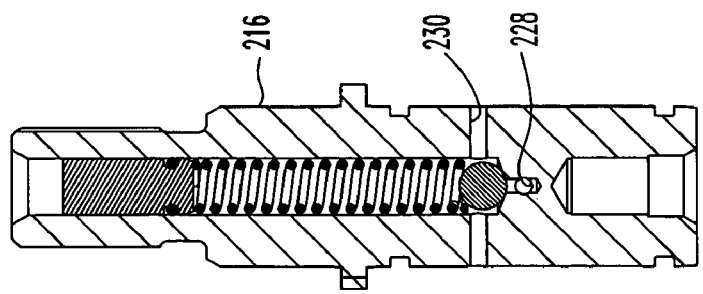
FIG. 16
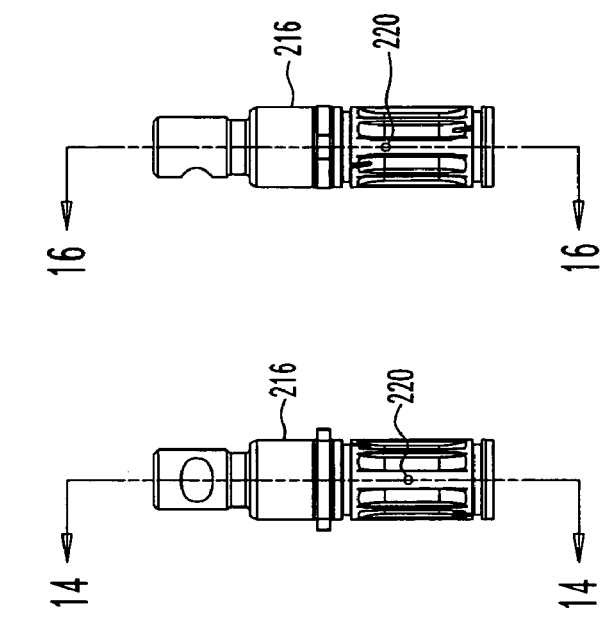
FIG. 15
FIG. 13
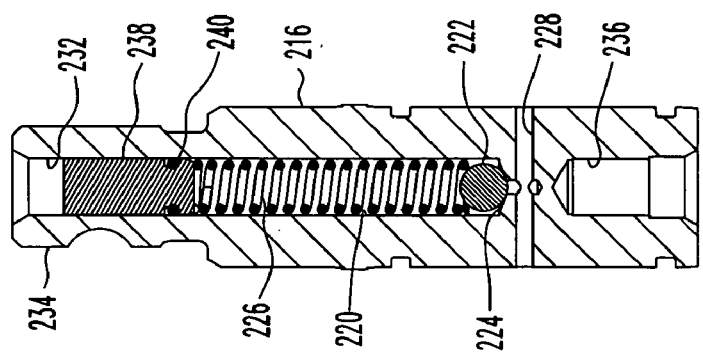
FIG. 14

CONTROL VALVE FOR A HYDRAULIC POWER STEERING SYSTEM

FIELD OF THE INVENTION

The invention relates to a hydraulic power steering system for turning the steerable wheels of a vehicle, and more particularly, to a control valve for controlling the flow of hydraulic fluid to a hydraulic motor of the power steering system.

DESCRIPTION OF THE PRIOR ART

Trucks and automobiles are commonly provided with a hydraulic power steering system to turn the steerable wheels of the vehicle. The driver turns the steering wheel and the power steering system generates the force to turn the wheels.

A typical hydraulic power steering system includes a pump that flows high-pressure hydraulic fluid to a hydraulic motor. The hydraulic motor has a movable piston that drives an output member connected to the vehicle steering linkage. The wheels are mounted to the steering linkage.

Movement of the piston drives the output member to turn the wheels left or right. For a right turn, fluid flows to one side of the piston and drives the piston in a direction that turns the wheels right. For a left turn, fluid flows to the other side of the piston and drives the piston in the opposite direction that turns the wheels left.

The flow between the pump and hydraulic motor is controlled by a control valve. The control valve receives flow from the pump and controls the flow to the hydraulic motor. Operating the control valve directs the flow of fluid to one side of the piston or the other, and controls the amount of flow to the piston.

The control valve is connected to the steering wheel such that turning the steering wheel operates the control valve. During straight-ahead driving the steering wheel is centered. The control valve is in a centered condition and the wheels are straight. If the steering wheel is turned right, the control valve is placed in an off-center condition that flows fluid to one side of the piston. The wheels turn right. If the steering wheel is turned left, the control valve is placed in an off-center condition that flows fluid to the other side of the piston. The wheels turn left.

Operating the control valve closes a flow restriction or flow orifice in the control valve. The orifice directs the flow of fluid to one side of the piston or the other. The orifice forces some fluid to flow to the piston and move the piston. The remaining fluid flows through the orifice and returns to the pump. The orifice is a variable-flow orifice that closes with increasing steering wheel rotation. This flows more fluid to the piston and provides increasing power assist for the driver.

Fluid flowing through the control valve, however, may generate noise. A common cause of noise is cavitation of the fluid flowing through the orifice. Cavitation is caused by bubbles forming in the fluid as a result of the static fluid pressure dropping as the fluid flows through the orifice. If the pressure drop is great enough, the bubbles form and implode as the fluid is discharged from the orifice. The implosions generate noise that may be heard in the vehicle passenger compartment.

The likelihood that a particular fluid will cavitate is given by the Cavitation Number $C_a$:

$$C_a = (P_a - P_v) * A^2 / (\tfrac{1}{2} * p * Q^2) \text{ where}$$

$P_a$=static fluid pressure at the orifice discharge;
$P_v$=vapor pressure of the hydraulic fluid;
A=cross-sectional area of the orifice;
p=mass density of the hydraulic fluid; and
Q=volumetric flow rate of hydraulic fluid through the orifice.

The higher the Cavitation Number the less likely it is that cavitation will occur. Cavitation Number increases for a given flow rate Q with increasing orifice area A and increasing discharge pressure. The critical Cavitation Number above which flow will usually not cavitate is typically between 0.2 and 1.5 for hydraulic fluids.

As truck cabs and automobile interiors have become quieter, demands have been placed on power steering manufacturers to reduce power steering noise.

Reducing cavitation can reduce power steering noise. To reduce cavitation, some control valves include two orifices arranged in series within the valve. Each orifice can be larger than a single, sole orifice to flow the same volume of fluid. The increased orifice area increases the Cavitation Number for each orifice and reduces the likelihood of cavitation. Furthermore, the upstream orifice has a greater discharge pressure that further increases its Cavitation Number.

Although placing two orifices in series may increase Cavitation Number, known control valves do not configure the two orifices to best minimize noise.

In one known control valve, both upstream and downstream orifices close but remain identically sized with one another. The Cavitation Number of the upstream orifice is always higher than the Cavitation Number of the downstream orifice. This is caused by the discharge pressure of the upstream orifice always being greater than the discharge pressure of the downstream orifice. The downstream orifice is more likely to cavitate than the upstream orifice. This limits the overall effectiveness of the two orifices to reduce noise.

In another known control valve the downstream orifice closes to a minimum area and maintains that minimum area with further rotation of the steering wheel. As the upstream orifice continues to close, the entire pressure drop effectively occurs through the upstream orifice. The upstream orifice essentially functions as a sole orifice. The benefit of having two orifices in series to reduce noise is lost.

In yet another known control valve the downstream orifice is always smaller than the upstream orifice. The Cavitation Number of the downstream orifice, therefore, is decreased as compared to having two equally-sized orifices. Accordingly the downstream orifice is more likely to cavitate. Hence the downstream orifice limits the effectiveness of the two orifices to reduce noise.

Additionally, having two orifices in series can affect reliability of the control valve. Variations in orifice size caused by manufacturing tolerances may cause the steering wheel to "stick" as the driver attempts to turn the steering wheel.

Conventional control valves have two or more fluid circuits that flow fluid within the valve. Each fluid circuit includes a set of upstream and downstream orifices. The fluid circuits extend around or along a movable inner valve member connected to the steering column. The circuits are arranged symmetrically so that no side forces are generated against the valve member.

Variations in orifice sizes caused by manufacturing tolerances, however, generate a load imbalance that applies a side force against the valve member. Power steering systems for heavy duty trucks operate at sufficiently high pressures that this side force may cause "stiction", or resistance to valve movement, that is perceived by the driver as sticking of the steering wheel during turning.

Furthermore, control valves are typically mounted in a bearing cap or the like that forms part of the power steering system. The bearing cap may mount a pressure relief valve fluidly connected in parallel with the control valve. The relief valve prevents a fluid overpressure from being delivered to the hydraulic motor.

The location of the relief valve in the bearing cap can vary according to vehicle manufacturers' requirements, and some manufacturers eliminate the relief valve entirely. A number of otherwise identical bearing caps must be manufactured and kept in inventory to satisfy different vehicle manufacturers' requirements.

It would be desirable that a quiet and reliable control valve incorporate a pressure relief valve to reduce the different types of bearing caps that must be kept in inventory, thereby reducing the overall cost of the power steering systems.

Therefore there is a need for an improved control valve for reducing noise in hydraulic power steering systems. The improved control valve should be reliable under heavy duty operating conditions and should incorporate a pressure relief valve to lower inventory costs.

SUMMARY OF THE INVENTION

The present invention is an improved control valve that reduces noise in hydraulic power steering systems. The control valve is reliable under heavy duty conditions and can include a pressure relief valve to lower inventory costs.

A control valve in accordance with the present invention includes first and second orifices in series in a flow path. The first and second orifices each close with operation of the control valve from the centered condition. The orifices close to an essentially fully closed condition at about the same movement of the control valve from the centered condition to a closed condition of the control valve.

The second orifice is downstream from the first orifice and has a substantially larger flow area than the first orifice when the first and second orifices are not fully closed.

Maintaining the area of the downstream orifice larger than the upstream orifice when the orifices are open maximizes noise reduction. As discussed above, having the two orifices equal in size results in the upstream orifice always having a higher Cavitation Number than the downstream orifice. By reducing the upstream orifice and enlarging the downstream orifice, the Cavitation Number of the upstream orifice decreases and the Cavitation Number of the downstream orifice increases.

The relative sizes of the upstream and downstream orifices are selected to best match the Cavitation Numbers of the two orifices and reduce the overall likelihood of cavitation. Specific sizes of the upstream and downstream orifices are preferably determined based on the flow rate and pressure requirements of the specific power steering system incorporating the control valve.

Closing both orifices together ensures that the total pressure drop is effectively shared by both orifices even as the orifices approach the fully closed condition. This helps minimize noise when power assist is the greatest and the likelihood of cavitation is greatest.

A preferred embodiment of the control valve includes at least two fluid circuits, each circuit having a set of upstream and downstream orifices. Each set of orifices defines an intermediate pressure zone between them. An equalization passage fluidly connects the intermediate pressure zones and ensures that the pressures in the intermediate pressure zones are equal. This prevents stiction that would otherwise be caused by variations in orifice sizes due to manufacturing tolerances. The reliability of the control valve under heavy duty operating conditions is increased.

In yet other embodiments of the control valve the intermediate pressure zone includes at least one additional flow restriction that generates additional pressure drop. The sum of the pressure drop through the upstream and downstream orifices is reduced by the pressure drop through the intermediate zone, thereby reducing the likelihood of cavitation and noise. These additional flow restrictions can be formed by changing the direction of flow between the upstream and downstream orifices, or by placing additional orifices between the upstream and downstream orifices.

In additional embodiments of the control valve, the control valve includes a pressure relief valve that prevents a fluid overpressure from being delivered to the hydraulic motor. The pressure relief valve includes a bypass passage in the control valve extends between the valve inlet and exhaust in parallel with the flow path. A movable valving member in the bypass passage is held in a normally-closed position that closes the bypass passage. A fluid overpressure moves the valving member to open the bypass passage and relieve the overpressure condition. The operating characteristics of the pressure relief valve can be adapted to different power steering systems without modifying the bearing cap or other components of the system.

Other objects and features of the invention will become apparent as the description proceeds, especially when taken in conjunction with the accompanying 17 drawing sheets illustrating three embodiments of the invention.

BRIEF DESCRIPTION OF THE DRAWINGS

FIG. 13 is a top view of the second embodiment control valve;

FIG. 14 is a sectional view taken along lines 14—14 of FIG. 13;

FIG. 15 is a side view of the control valve shown in FIG. 13;

FIG. 16 is a sectional view taken along lines 16—16 of FIG. 13;

DESCRIPTION OF THE PREFERRED EMBODIMENTS

Figure 1:
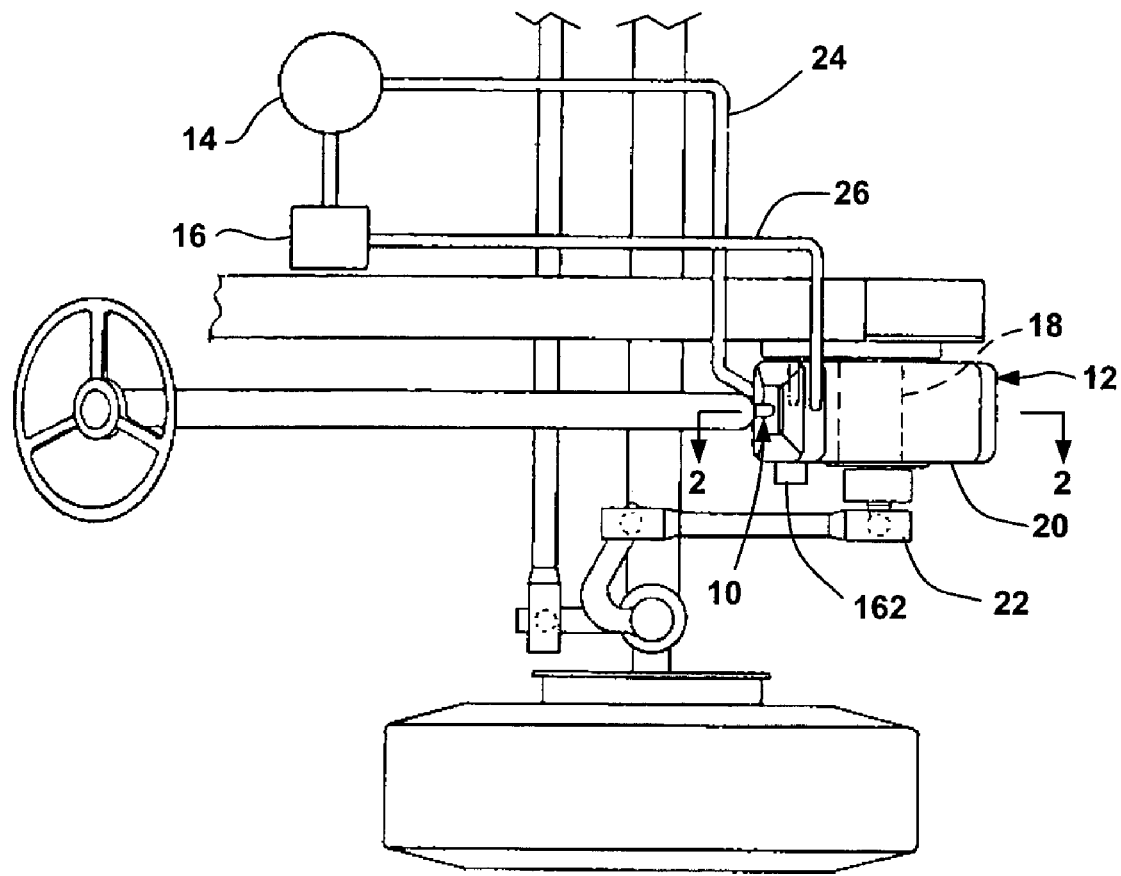
FIG. 1 is representational view of a hydraulic power steering system having a first embodiment control valve in accordance with the present invention.

FIG. 1 illustrates a first embodiment control valve 10 in accordance with the present invention. The control valve 10 forms part of a hydraulic power steering system 12 that turns the steerable wheels of a motor vehicle. The steering system 12 includes a pump 14 that flows power steering fluid from fluid reservoir 16 to a hydraulic motor 18 formed in high-pressure steering gear 20. Steering gear 20 could be an M-Series steering gear manufactured by R.H. Sheppard Company, Inc., Hanover, Pa., assignee of the present invention. Hydraulic motor 18 drives a Pitman arm 22 connected to the vehicle steering linkage to turn the wheels.

Control valve 10 is mounted in steering gear 20 and controls the flow of fluid from the pump 14 to the hydraulic motor 18. Supply line 24 flows fluid from the pump 14 to the control valve 10 and return line 26 flows fluid from the control valve 10 to the fluid reservoir 16.

Figure 2:
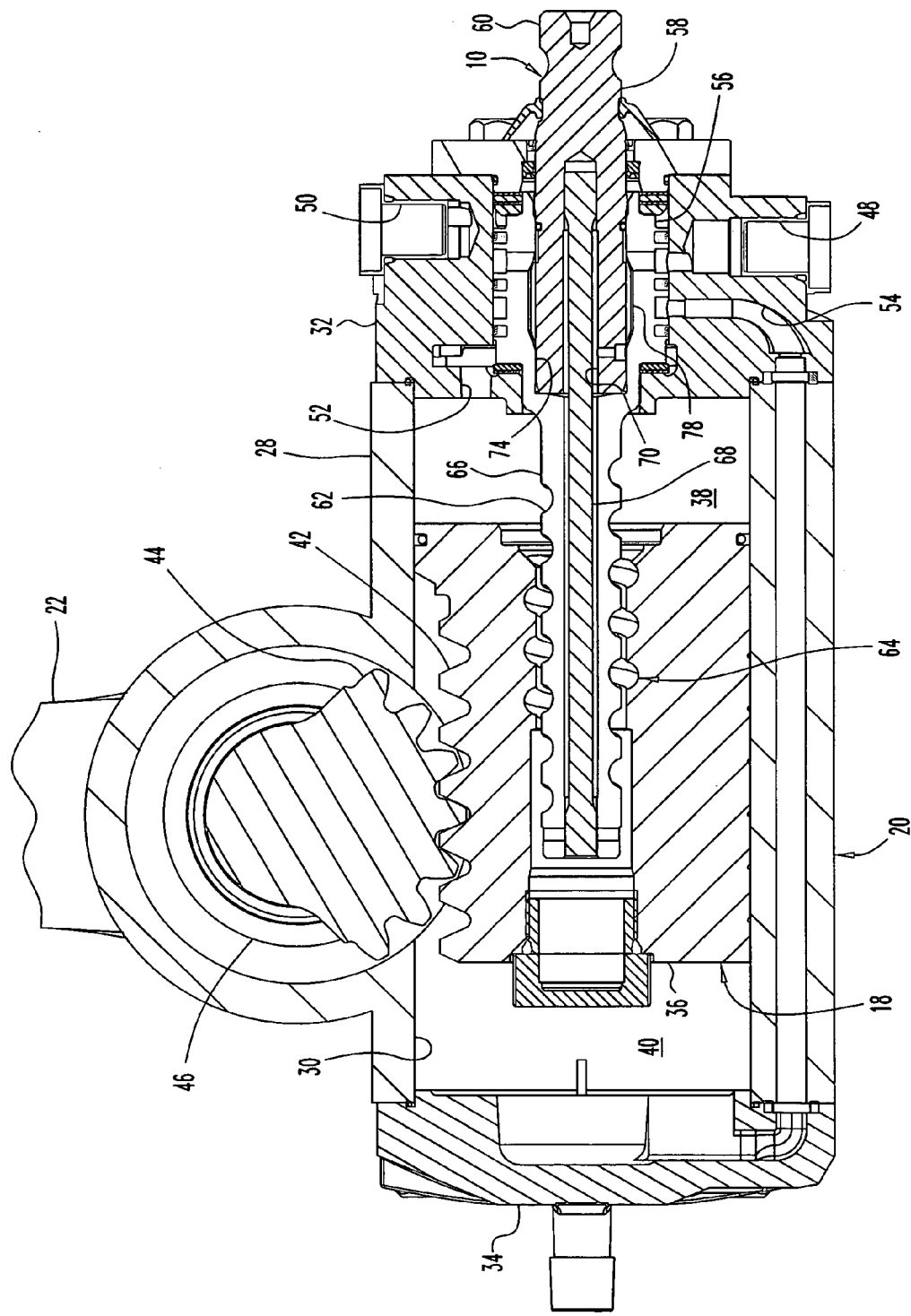
FIG. 2 is a sectional view of the power steering gear taken substantially along line 2—2 of FIG. 1.

Steering gear 20 includes a housing 28 that defines a chamber 30. See FIG. 2. Bearing cap 32 closes one end of the chamber and cylinder head 34 closes the other end of the chamber. Hydraulic motor 18 includes axially-movable motor piston 36 that sealingly divides the chamber 30 into first and second hydraulic motor chambers 38, 40 on either side of the piston. First motor chamber 38 is adjacent the bearing cap and second motor chamber 40 is adjacent the cylinder head. Toothed rack 42 formed on one side of the piston engages sector gear 44 attached to an output shaft 46 that extends into the housing. Pitman arm 22 is mounted on the output shaft 46 away from the steering gear 20.

Control valve 10 is supported in the bearing cap 32. The bearing cap 32 includes an inlet passage 48 that flows fluid from the supply line 24 to the control valve, and an outlet passage 50 that flows fluid from the control valve to the return line 26. First motor chamber passage 52 extends through the bearing cap to flow fluid between the control valve 10 and the first motor chamber 38. Second motor chamber passage 54 extends through the bearing cap and the gear housing 28 to flow fluid between the control valve 10 and the second motor chamber 40.

Bearing cap 32 functions as a housing for control valve 10 and houses outer valve member or valve sleeve 56 and inner valve member or valve core 58. Valve core 58 is coaxially mounted in the valve sleeve 56 for rotation about an axis of rotation. The valve core 58 has limited rotation from a centered position with respect to the valve sleeve 56 to operate the control valve. An end 60 of the valve core 58 extends out of the bearing cap 32 and is configured in a conventional manner for connection to a steering column that carries the steering wheel of the motor vehicle.

A co-axial tubular actuating shaft 62 extends from the valve sleeve 56 and engages a conventional recirculating ball assembly 64 carried in the piston 36. The actuating shaft 62 has a threaded outer surface that threadingly engages the balls of the ball assembly 64. Actuating shaft 62 and valve sleeve 56 are preferably formed as a one-piece integral member 66 (see also FIG. 3).

A torsion bar 68 within actuating shaft 62 is connected between the actuating shaft 62 and the valve core 58. The torsion bar biases the valve members 56, 58 to the centered condition of the valve 10. One end of the torsion bar is pinned to the actuating shaft 62. The other end of the torsion bar extends into a blind bore 70 on the inner end of the valve core 58 and is pinned to the valve core 58. Rotation of the valve core 58 from the centered position twists the torsion bar and generates a biasing force that urges the valve members 56, 58 back to the centered position.

Turning the steering wheel operates the control valve 10 and rotates the valve core 58 from a centered or non-steering position. This changes the control valve 10 from a centered condition to an off-center condition. This flows high-pressure hydraulic fluid from the control valve 10 through the first or second motor passages 52, 54 to one of the motor chambers 38, 40 on one side of the piston 36. Piston 36 then moves left or right and forces fluid out of the other motor chamber 40, 38. Fluid returning from the other motor chamber flows back to the control valve 10 through the other of the first or second motor passages 54, 52.

Piston movement causes rack 42 to drive the sector gear 44 and rotates Pitman arm 22 to turn the wheels left or right. Piston movement also causes the recirculating ball assembly 64 to rotate the actuating shaft 62 and the valve sleeve 56 relative to the valve core 58. Valve core 58 returns to a centered position with respect to valve sleeve 56 when the wheels have turned to the extent corresponding to the turning of the steering wheel. This returns control valve 10 to a centered condition in a conventional manner.

Figure 3:
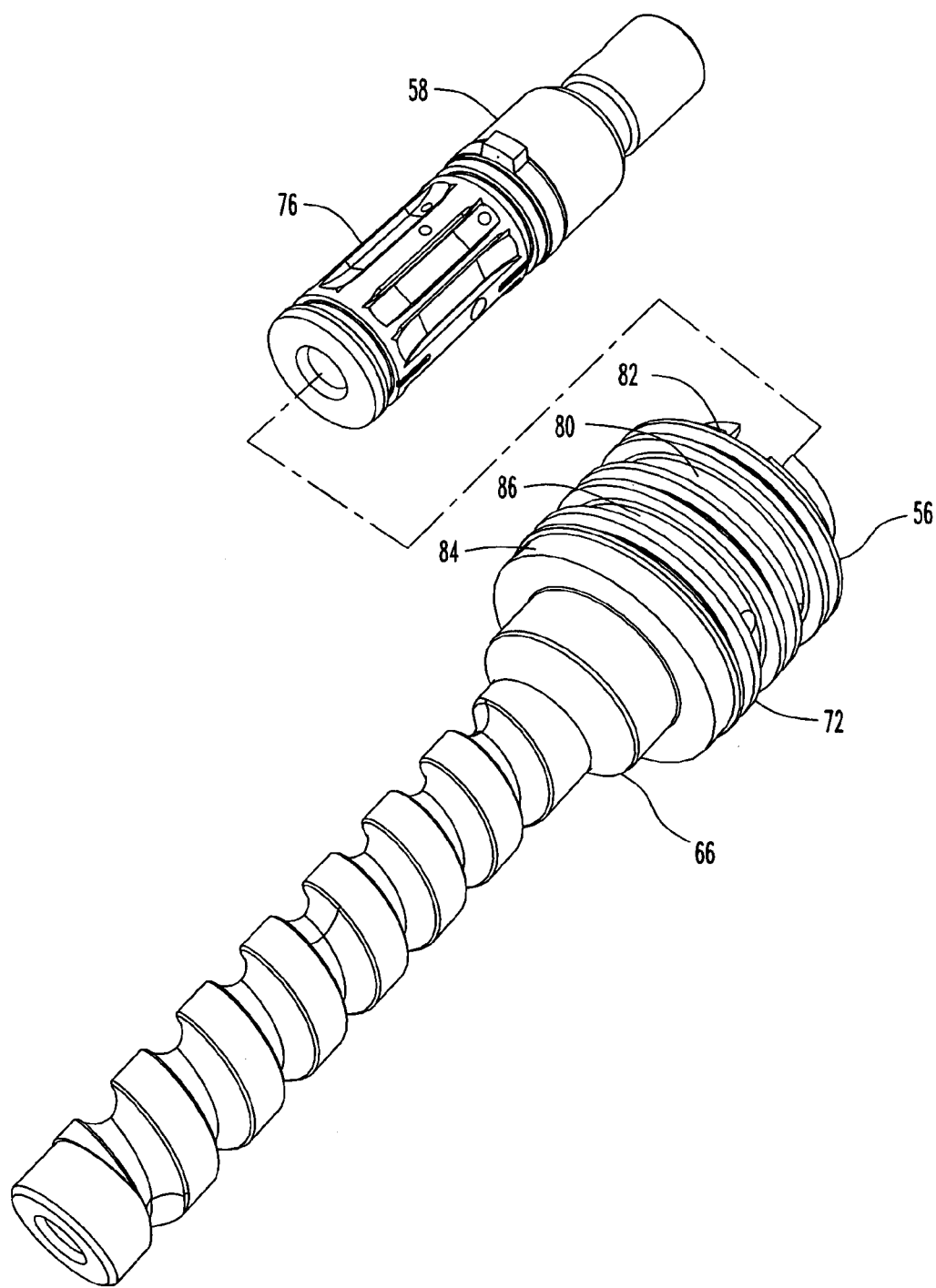
FIG. 3 is an exploded view of the inner and outer valve members of the first embodiment control valve.

FIG. 3 illustrates the valve core 58 and member 66. Valve sleeve 56 has a generally cylindrical outer periphery 72 and a generally cylindrical inner periphery 74 (see FIG. 2). Valve core 58 has a generally cylindrical outer periphery 76 that cooperates with the inner periphery of valve sleeve 56 to define an internal flow channel 78 (see FIGS. 2 and 4) between the valve members 56, 58.

Outer periphery 72 of valve sleeve 56 includes a number of axially-spaced annular grooves 80, 82, 84, and 86. The grooves cooperate with the bearing cap 32 to define flow passages flowing fluid into and out of the control valve 10. Inlet groove 80 is aligned with bearing inlet passage 48 and receives fluid flowing into the control valve from the pump 14. Outlet groove 82 is aligned with bearing outlet passage 50 and discharges fluid from the control valve 10 to the reservoir 16. First motor chamber groove 84 is aligned with first motor passage 52 and flows fluid between the control valve 10 and the first motor chamber 38. Second motor chamber groove 86 is aligned with second motor passage 54 and flows fluid between the control valve 10 and the second motor chamber 40.

Figure 4:
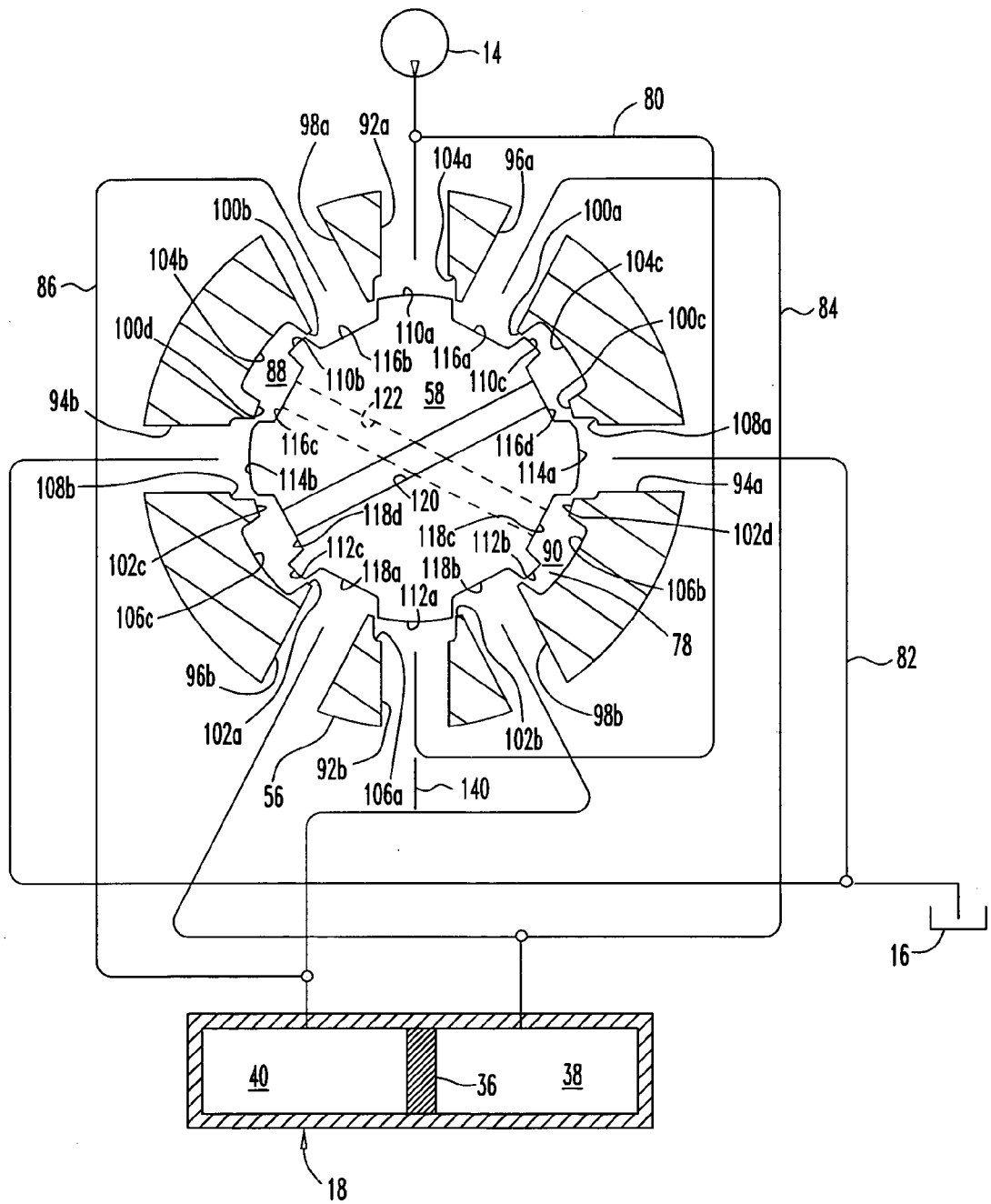
FIG. 4 is a schematic sectional view of the first embodiment control valve, the control valve in a centered condition.

FIG. 4 illustrates the control valve 10 in the centered or neutral condition. Valve core 58 is in a centered position with respect to valve sleeve 56. Flow passage 78 surrounds the outer periphery of the valve core. The upper half of flow passage 78 as shown in FIG. 4 forms a portion of a first flow passage or fluid circuit 88, and the lower half forms a portion of a like second flow passage or fluid circuit 90. The fluid circuits 88, 90 are arranged in parallel to direct the flow of fluid between flow passage 78 and the motor chambers 38, 40 as will be discussed in greater detail below.

Valve sleeve 56 includes sets of ports that are each associated with a respective fluid circuit 88 or 90 to connect the circuit with the annular flow passages 80–86. Each set of ports include an inlet port 92a or 92b that flows fluid from inlet flow passage 80 into the circuit and a pair of exhaust ports 94a and 94b located ninety degrees from corresponding inlet port 92a or 92b. The exhaust ports 94a, 94b are shared by both fluid circuits and discharge fluid from the fluid circuits into outlet passage 82. First motor port 96a or 96b is located on one side of corresponding inlet port 92a or 92b and flows fluid between the fluid circuit and the first motor chamber groove 84. Second motor port 98a or 98b is located on the other side of the corresponding inlet port 92 and flows fluid between the fluid circuit and the second motor chamber groove 86.

Valve sleeve 56 has eight lands 100a, 100b, 100c, 100d, 102a, 102b, 102c, and 102d that extend axially and are spaced apart circumferentially on inner periphery 74. Lands 100, 102 define circumferentially-spaced apart axial grooves 104a, 104b, 104c, 106a, 106b, 106c, 108a, and 108b between alternate lands.

Lands 100 and grooves 104 are associated with the first fluid circuit 88, lands 102 and grooves 106 are associated with the second fluid circuit 90, and grooves 108 are shared between the circuits. Inlet ports 92a and 92b open into respective grooves 104a and 106a and exhaust ports 94a and 94b open into respective grooves 108a and 108b. First motor ports 96a and 96b extend through respective lands 100a and 102a and second motor ports 98a and 98b extend through respective lands 100b and 102b.

Valve core 58 has eight lands 110a, 110b, 110c, 112a, 112b, 112c, 114a, and 114b that extend axially and are spaced apart circumferentially on outer periphery 76. Lands 110, 112, and 114 define circumferentially-spaced apart axial grooves 116a, 116b, 116c, 116d, 118a, 118b, 118c, and 118d between alternate lands. Lands 110 and grooves 116 are associated with the first fluid circuit 88, and lands 112 and grooves 118 are associated with the second fluid circuit 90.

Inlet ports 92a and 92b face respective core lands 110a and 112a. Exhaust ports 94a and 94b face respective core lands 114a and 114b. First motor ports 96a and 96b face respective core grooves 116a and 118a. Second motor ports 98a and 98b face respective core grooves 116b and 118b.

A pair of axially-spaced equalization passages 120 and 122 fluidly connect respective pairs of core grooves 116d, 118d and 116c, 118c. Each passage 120, 122 is entirely within the valve core 58 and is formed as a through-bore extending along a diameter of the valve core. The function of equalization passages 120, 122 will be explained in greater detail later.

Valve sleeve 56 and valve core 58 are each symmetrical about a common central axial plane 140 when control valve 10 is in the neutral condition. Core land 110a is centered in sleeve groove 104a, and core lands 114a and 114b are centered in sleeve grooves 108a and 108b respectively. Core lands 110b and 110c, however, are each offset towards the side of adjacent sleeve land 100b or 100a. It is understood that the corresponding core and sleeve lands in fluid circuit 90 are arranged in like manner.

Figure 5:
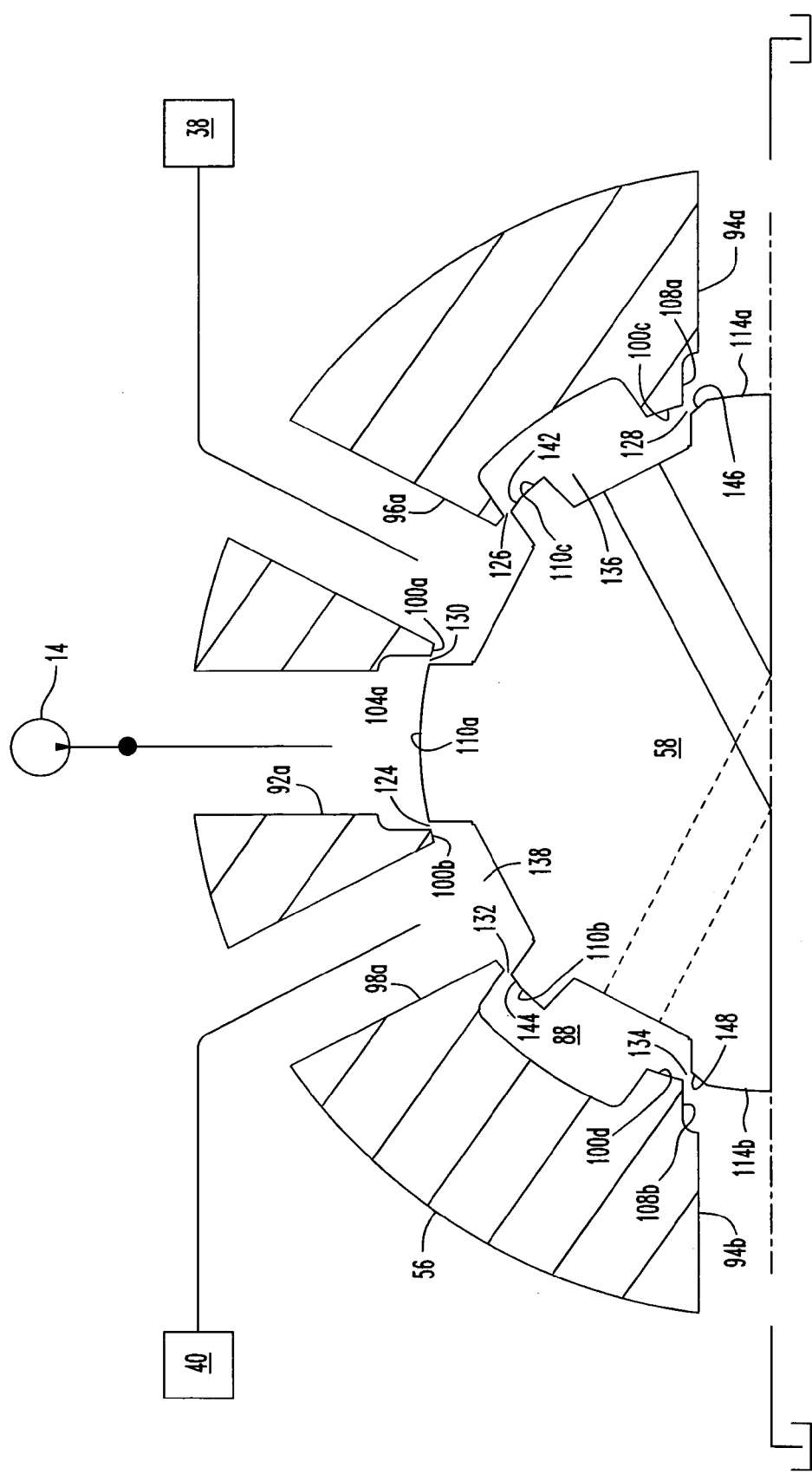
FIG. 5 is an enlarged view of a portion of FIG. 4.

Valve core lands 110, 112 and 114 cooperate with valve sleeve lands 100, 102 to define variably-sized restrictions or variable flow orifices in the fluid circuits 88, 90. FIG. 5 illustrates flow orifices 124-136 in the upper fluid circuit 88, it being understood that the following discussion also applies in like manner to the lower fluid circuit 90.

Orifice 124 is between pump inlet 92a and second motor port 98a and is defined by core land 110a and sleeve land 100b. Orifices 126 and 128 are both between first motor port 96a and exhaust port 94a. Orifice 126 is defined by core land 110c and sleeve land 100a and orifice 128 is defined by core land 114a and sleeve land 100c.

Orifice 130 is between inlet port 92a and first motor port 96a and is defined by core land 110a and sleeve land 100a. Orifices 132 and 134 are both between second motor port 98a and exhaust port 94b. Orifice 132 is defined by core land 11b and sleeve land 100b, and orifice 134 is defined by core land 114b and valve land 100d.

As shown in FIG. 5, orifices 124-134 are each open when valve core 58 is in the centered position. The size of each orifice is essentially established by the circumferential spacing between associated pairs of sleeve and core lands defining the orifice.

Fluid from the pump 14 enters fluid circuit 88 through motor port 92a. Circuit 88 is symmetrical about motor port 92a, with inlet port 92a dividing fluid circuit 88 into a first flow passage 136 extending from inlet port 92a to exhaust port 94a and a second flow passage 138 extending from inlet port 92a to exhaust port 94b.

Orifice 124 is located at the entrance to second flow passage 138, and orifice 130 is located at the entrance to first flow passage 136. Orifices 124 and 130 are referred to herein as pressure orifices because they affect pressurization of the motor ports as will be explained in greater detail below. Pairs of orifices 126, 128 and 130, 132 are arranged in series in respective flow passages to flow fluid to exhaust. Orifice 126 is upstream of orifice 128 in flow passage 136, and orifice 132 is upstream of orifice 134 in flow passage 138. Because of their relative locations, orifices 126 and 132 are referred to herein as upstream exhaust orifices and orifices 128 and 134 as downstream exhaust orifices.

Flows through passages 136 and 138 are essentially balanced and substantially equal when the control valve 10 is centered. The fluid pressure at first motor port 96a is effectively the same as the fluid pressure at second motor port 98a.

Fluid flow through fluid circuit 90 is balanced in the same way as fluid circuit 88. As a result, fluid pressures in motor chambers 38 and 40 are substantially equal and the piston 36 is stationary.

Turning the steering wheel rotates core valve 58 from its centered position. This closes some of the orifices in the fluid circuits 88, 90 and opens the others. Flow through fluid circuit 88 is described below, it being understood that the description is also applicable to fluid circuit 90.

From the perspective of FIG. 5, counterclockwise rotation of valve core 58 closes orifices 124, 126, and 128 and opens orifices 130, 132, and 134. Clockwise rotation closes orifices 130, 132, and 134 and opens orifices 124, 126, and 128. The closing orifices restrict flow. This generates a pressure imbalance that pressurizes one motor port 96a or 98a and flows high-pressure fluid into the motor chamber connected to the motor port. Fluid flows out of the other, low-pressure motor chamber and through the other motor port 98a or 96a. The orifices that open do not substantially impede or restrict flow. Flow for counterclockwise operation is described next, it being understood the description is also applicable to clockwise rotation.

Figure 6:
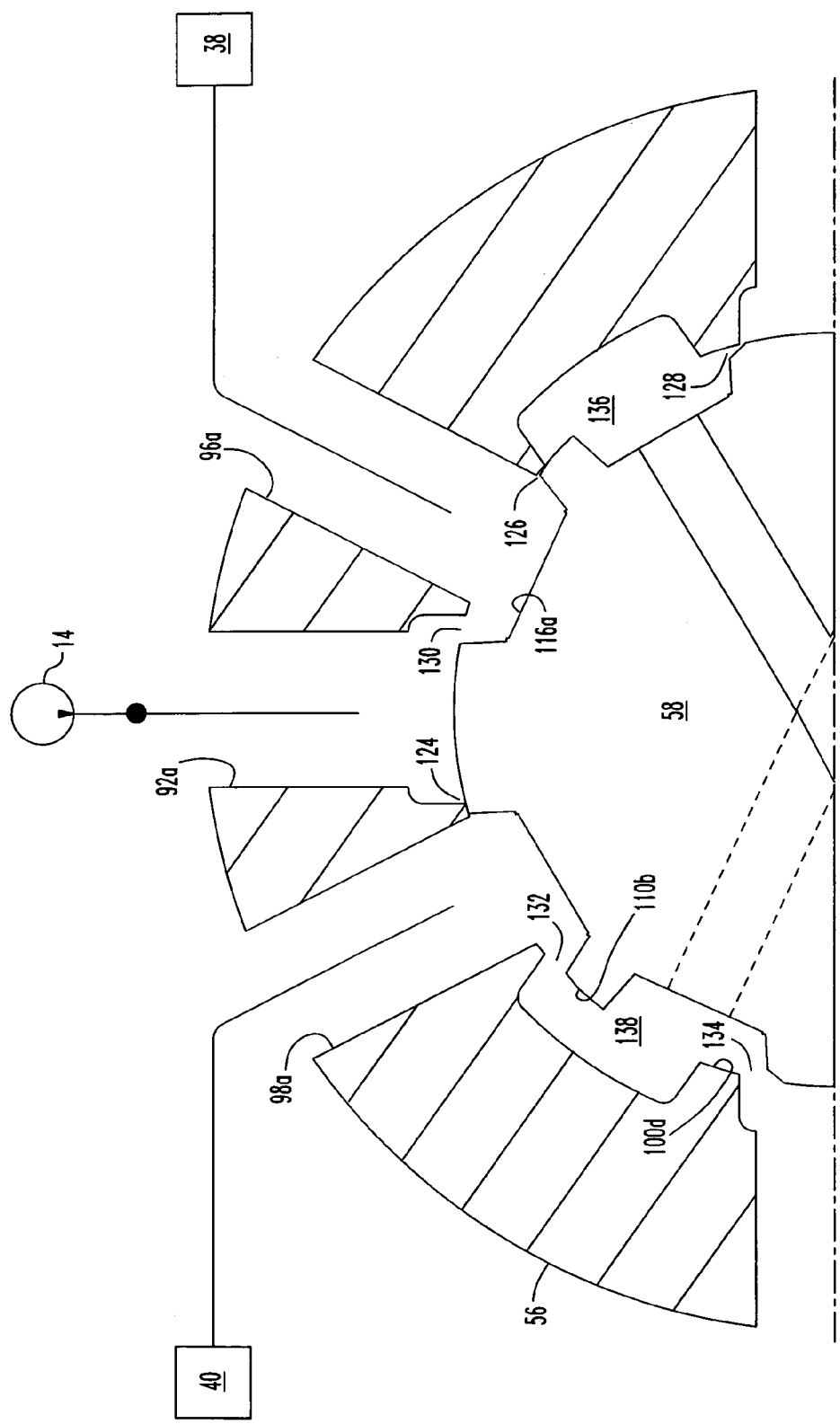
FIG. 6 is a view similar to FIG. 5 but with the control valve in an off-center condition.

FIG. 6 illustrates valve core 58 rotated counterclockwise from the straight-ahead, centered position to an operating position for power-assisted steering. Control valve 10 is now in an off-center condition as compared to the centered condition shown in FIG. 5.

Rotation constricts orifices 124, 126 and 128 and enlarges orifices 130, 132 and 134. Orifice 130 is at the entrance of first flow passage 136 and opens to permit essentially unimpeded flow from inlet port 92a to flow passage 136. Pressure orifice 124 is at the entrance of second flow passage 138 and restricts flow from inlet port 92a to second flow passage 138. As a result, flow from inlet port 92a to first flow passage 136 increases and flow to second flow passage 138 decreases. This pressurizes core groove 116a and flows fluid out of first motor port 96a to first motor chamber 38, moving piston 36 to the left as viewed in FIG. 2.

Piston 36 forces fluid from second motor chamber 40 through second motor port 98a to second flow passage 138. Orifices 132 and 134 in second flow passage 138 downstream of second motor port 98a are open and the return flow is essentially unobstructed to exhaust port 94b.

Note in FIG. 6 that the leading edge of core land 110b is sufficiently spaced away from sleeve land 100d that no restrictive orifice forms between lands 110b and 100d with counterclockwise rotation of the valve core 58. If a flow restriction is desired in flow passage 138 downstream of second motor port 98a, then lands 110b and 100d can be sized to form such a flow restriction.

Upstream exhaust orifice 126 and downstream exhaust orifice 128 are in series in first flow passage 136 downstream from the first motor port 96a as described. The orifices 126, 128 essentially control flow through first motor port 96a by generating a pressure in core groove 116a. Orifices 126 and 128 close continuously with rotation until the valve 10 reaches a fully closed condition.

Exhaust orifices 126, 128 are initially substantially open and generate relatively low backpressure. Most of the flow in flow passage 136 flows through orifices 126, 128, and only a relatively small of pressure is exerted on motor port 96a. In this condition power assist is low. As orifices 126, 128 close, pressure increases, pressure to motor port 96a increases, and power assist increases. At the fully closed condition, all flow (less leakage through closed orifices) from inlet port 92a flows through motor port 96a for maximum power assist.

The rate at which an orifice 124, 126, or 128 closes is a function of the circumferential spacing of the valve lands defining the orifice and the shape of the valve land edges forming the orifice. Establishing the closing rate, and changing the closing rate with rotation of the control valve by configuring the valve lands and the shape of the lands is known in the art and so will not be described in detail.

Figure 7A:
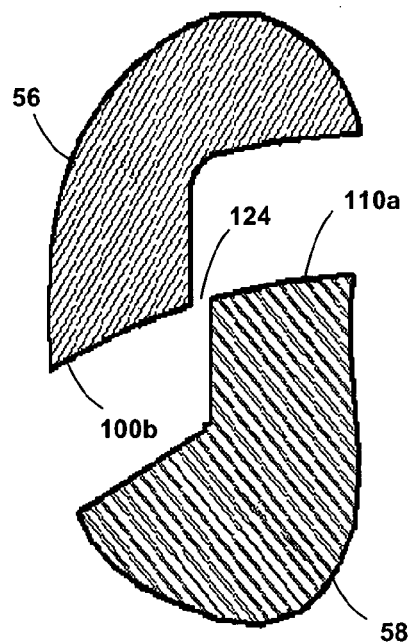
FIGS. 7a, 7b and 7c are enlarged views of the closing orifices shown in FIG. 6.
Figure 7B:
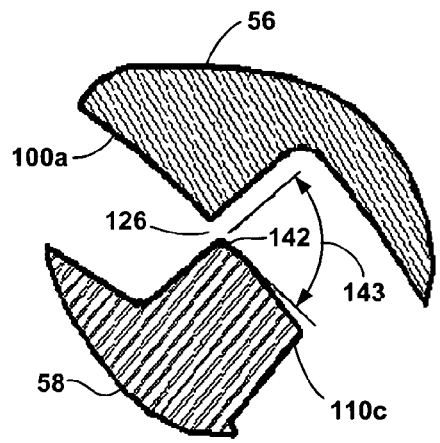
Figure 7C:
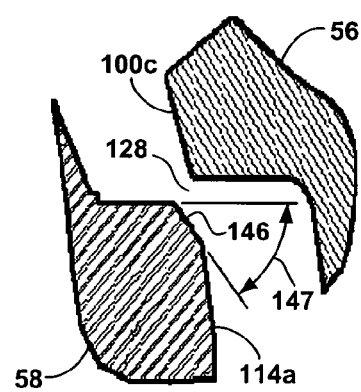

FIGS. 7a, 7b, and 7c are enlarged views of orifices 124, 126, and 128 respectively. In the illustrated embodiment core land 110a has a uniform or constant outer radius that is slightly less than the inner radius of sleeve land 100b. See FIG. 7a. Core land 110c includes a control edge 142 that faces sleeve land 100a. See FIG. 7b. Edge 142 is inclined at an angle 143 of 70.3 degrees from the radial as shown. Core land 110b includes a control edge 144 (see FIG. 5) like edge 142 but facing sleeve land 100b. Core land 114a includes a control edge 146 facing sleeve land 100c. See FIG. 7c. Edge 146 is inclined at an angle 147 of 48.5 degrees from the radial as shown. Core land 114b includes a control edge 148 (see FIG. 5) like control edge 146 but facing sleeve land 100d.

Each control edge 142, 144, 146, and 148 is a flat surface extending axially along the land and formed as a chamfer or bevel on a corner of the land. In other embodiments the control edges could include curved surfaces, could be present exclusively on the sleeve lands, or could be on both sleeve and core lands.

Figure 8:
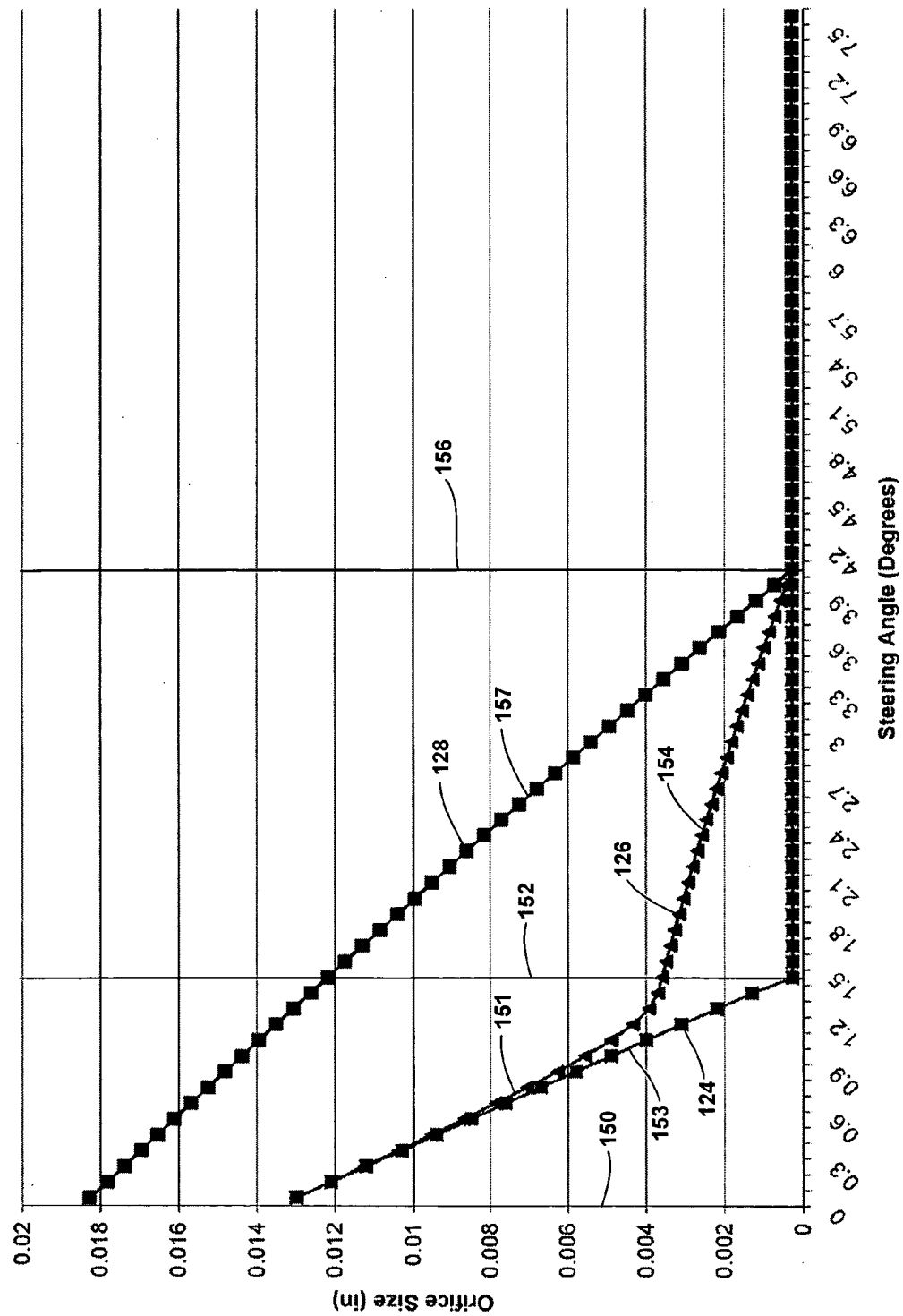
FIG. 8 is a valve curve for the control valve plotting the areas of the closing flow orifices in the control valve against the relative angular rotation of the valve core with respect to the valve sleeve.

FIG. 8 is a valve curve of the control valve 10. The curve plots the size of orifices 124, 126, and 128 as a function of steering angle (the relative angular rotation of valve core 58 from the centered position). The size of the orifice is the minimum width of the orifice cross-section perpendicular to the valve axis. Because the axial length of each orifice is much greater than its width, the effective flow area of each orifice is essentially directly proportional to orifice size.

Pressure orifice 124 preferably closes quickly from the initial centered condition 150 of the valve 10. Core land 110a is initially spaced away from sleeve land 100b to define the initial size of orifice 124. Orifice 124 closes as core land 110a approaches sleeve land 10b. Orifice 124 closes at a substantially constant rate 151 as shown. The leading edge of core land 110a comes under sleeve land 100b after a rotation of about 1.5 degrees, fully closing orifice 124. This represents a first operating condition 152 of the control valve 10. Quickly closing the pressure orifice 124 helps avoid "grump", an unstable flow condition known in the hydraulic power steering art.

Upstream exhaust orifice 126 is initially the same size as the pressure orifice 124. Orifice 126 initially closes at a first closing rate 153 substantially equal to the closing rate of the pressure orifice 124. As the control valve 10 reaches operating position 152, orifice 126 begins closing at a second, lower closing rate 154. Orifice 126 closes at this essentially constant second closing rate until the control valve reaches a fully closed condition 156 at a rotation of about 4 degrees. The control valve 10 can continue to rotate beyond the fully closed position.

In the illustrated embodiment the initial closing rate of upstream exhaust orifice 126 is determined by the circumferential spacing of core land 110c from sleeve land 100a. After control edge 142 moves under sleeve land 100a, the slope of control edge 142 establishes the second closing rate. Other arrangements of land spacing and control edge configuration, including control edges having multiple sloped surfaces, could be used in alternative embodiments.

Downstream exhaust orifice 128 closes with upstream exhaust orifice 126. Orifice 128 also fully closes when the control valve reaches fully closed valve condition 156, and closes at a substantially constant closing rate 157 from the centered condition 150 to the fully closed condition 156. The closing rate is established by the initial spacing of core land 114a from sleeve land 100c and the slope of control edge 146. Downstream orifice 128 is larger than upstream exhaust orifice 126 until both orifices fully close.

Between the first operating condition 152 and the fully closed condition 156, downstream exhaust orifice 128 is about three times larger than upstream exhaust orifice 126. Because orifices 126 and 128 both fully close at about 4 degrees, the closing rate of downstream exhaust orifice 128 is also about three times greater than the closing rate of upstream exhaust orifice 126 between operating conditions 152 and 154.

Exhaust orifices 126 and 128 cooperate to generate relatively lower power assist at small steering angles and greater power assist at larger steering angles for parking or sharp turns at low speed. Drivers generally prefer power steering systems having these steering characteristics.

Figure 9:
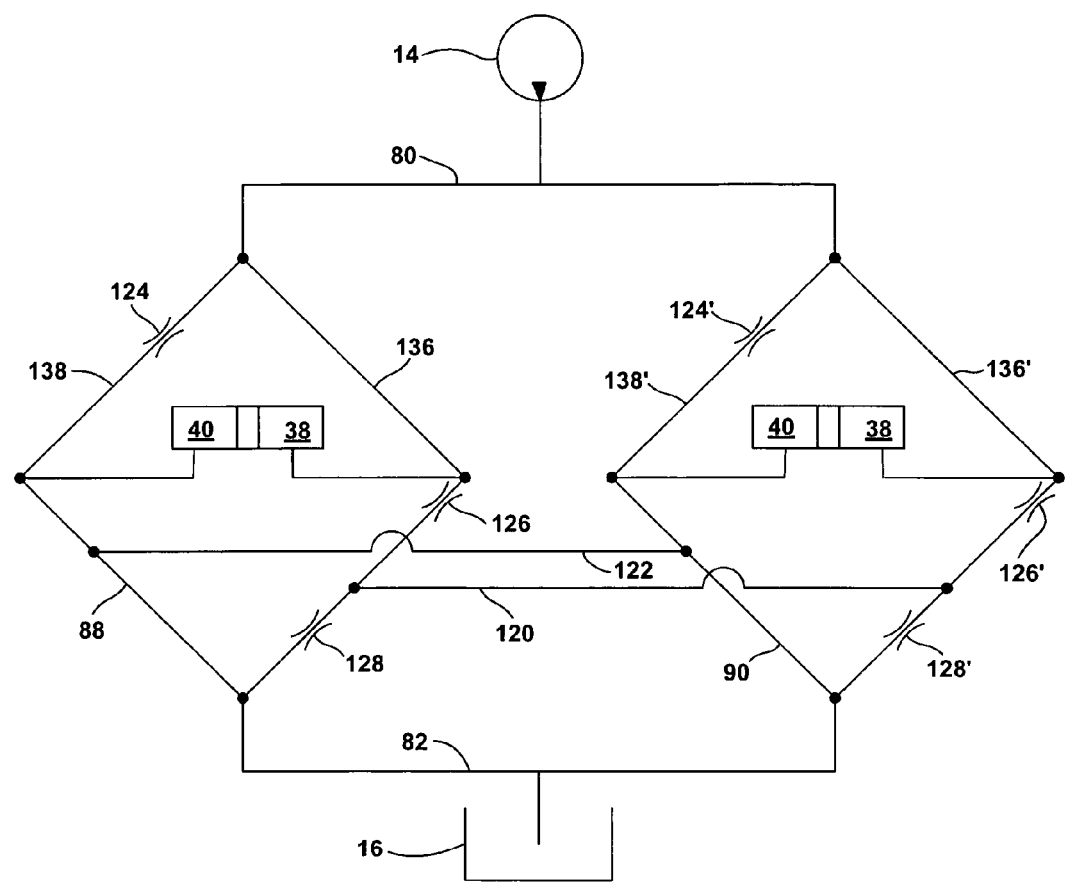
FIG. 9 is a representational hydraulic diagram of the fluid circuits in the first embodiment control valve with the control valve in the off-center condition.

FIG. 9 is a Wheatstone diagram of fluid circuits 88, 90 in control valve 10 when the control valve in the off-center condition shown in FIG. 6. Fluid circuits 88, 90 are arranged in parallel between inlet passage 80 and outlet passage 82. Orifices 130, 132 and 134 are omitted from the diagram because they open with increasing rotation.

A mathematical model of fluid circuits 88, 90 was used to arrive at the configuration of the upstream and downstream exhaust orifices 126, 128. The model calculates orifice sizes for a proposed configuration for different steering angles. The calculated areas are used to calculate the flow through the fluid circuits 88, 90 by solving simultaneous equations of flow through various portions of each circuit.

Sizes of orifices 126, 128 were determined by maximizing the cavitation numbers through exhaust orifices 126, 128 for a fluid pressure of about 1500 pounds per square inch and a flow rate of about 3.7 gallons per minute. This represents a typical output requirement for a heavy-duty truck as opposed to full torque output. In the illustrated embodiment it is desired to minimize noise at a typical operating condition of the steering system 12. Different operating conditions can be used as starting points for control valve analysis in other embodiments, based on engineering judgment and specific pressure and flow requirements.

For the illustrated embodiment it was determined that the size of downstream exhaust orifice 128 should be about three times the size of upstream exhaust orifice 126 at the chosen operating condition. This reduces the perceived noise from control valve 10 in half as compared to a conventional single-stage control valve at the same operating condition.

The spacing of the core and sleeve lands associated with exhaust orifices 126 and 128, and the slope of control edges 142 and 146 were selected to obtain the desired valve curve.

Figure 10:
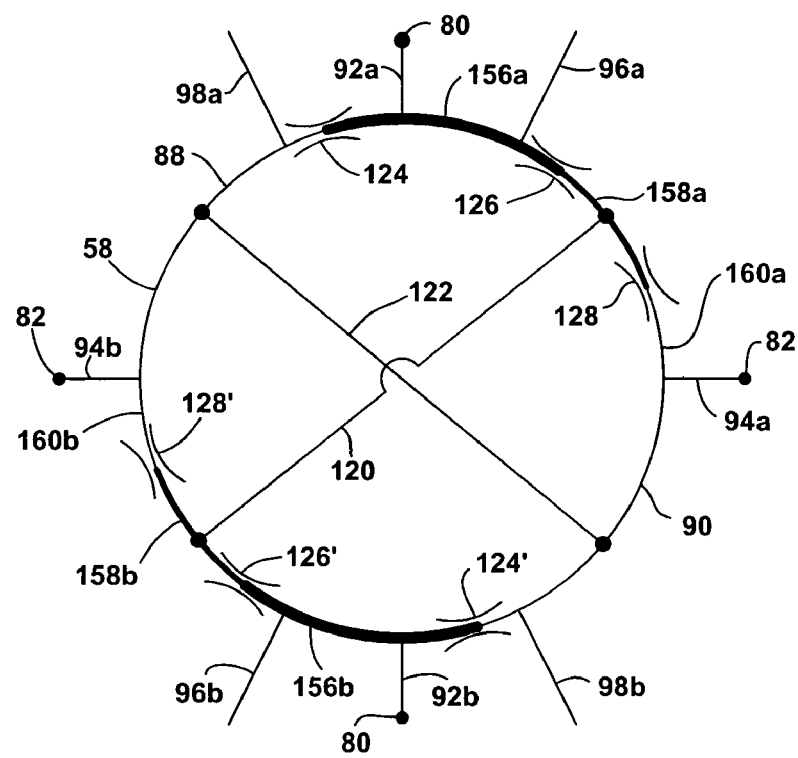
FIG. 10 is a representational view of the fluid circuits extending around the valve core of the control valve when the valve core is rotated in a first direction.

FIG. 10 is a representational view of the fluid circuits 88, 90 extending around the valve core 58 when the valve core 58 in the off-center position shown in FIG. 6. Each circuit 88, 90 extends 180 degrees around the valve core 58. In circuit 88 pressure orifice 124 and upstream exhaust orifice 126 define between them a high pressure zone 156*a*. An intermediate pressure zone 158*a* is defined between upstream and downstream exhaust orifices 126 and 128. A low pressure zone 160*a* extends from the downstream exhaust orifice 128 to the exhaust port 94*a*. Like high pressure zone 156*b*, intermediate pressure zone 158*b*, and low pressure zone 160*b* are in fluid circuit 90. The corresponding orifices and pressure zones in fluid circuit 90 have the same reference numerals but are marked with primes.

The corresponding pairs of pressure zones 156, 158, and 160 are diametrically across from each other on valve core 58. As a result, the net radial force acting on valve core 58 is theoretically zero. Stiction, or resistance to relative rotation, could occur between valve core 58 and valve sleeve 56 when pressure in the intermediate zones 158 were relatively high. It is believed such stiction would be caused by a net radial force applied against valve core 58 generated by a pressure difference between intermediate zone 158*a* and intermediate zone 158*b*.

High pressure zones 156*a*, 156*b* are both fluidly connected to common valve inlet passage 80 by respective inlet ports 92*a*, 92*b*. Low pressure zones 160*a*, 160*b* are both fluidly connected to common outlet passage 82 by respective exhaust ports 94*a*, 94*b*. The pressure in zones 156 and 160 are established by the inlet pressure and exhaust pressure respectively and so the pressure in the individual zones of each pair of pressure zones 156 and 160 are equal with one another.

The pressure in each intermediate pressure zones 158*a* or 158*b* is a function of the upstream and downstream exhaust orifices defining the intermediate pressure zone. Corresponding exhaust orifices in the two fluid circuits 88, 90 are theoretically identical with one another, and so the pressure in the intermediate pressure zones 158*a* and 158*b* would also be theoretically equal.

Manufacturing tolerances, however, can cause one or both orifices in one fluid circuit 88 to be larger or smaller than the corresponding orifice in the other fluid circuit 90.

As a result of these manufacturing tolerances, pressures in intermediate zones 158*a* and 158*b* are not likely to be equal. The pressure difference generates a net radial force urging the valve core 58 to one side. It is believed this force generates the observed stiction.

Equalization passage 120 fluidly connects intermediate pressure zones 158*a* and 158*b* formed when valve core 58 is rotated counterclockwise. This equalizes pressure in both intermediate pressure zones despite variations in orifice size. Equalization passage 122 fluidly connects the low pressure zones.

Figure 11:
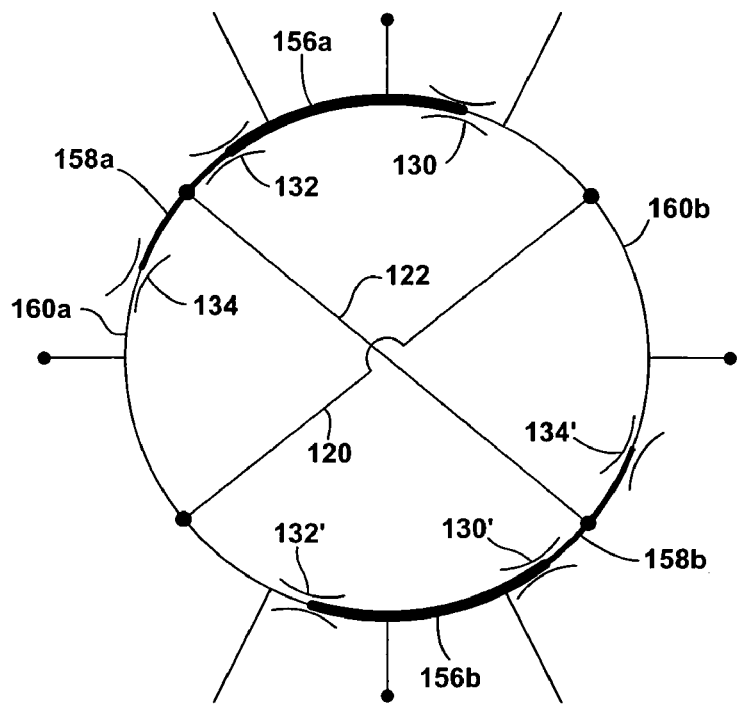
FIG. 11 is a view similar to FIG. 10 but with the valve core rotated in a second direction.
Figure 12:
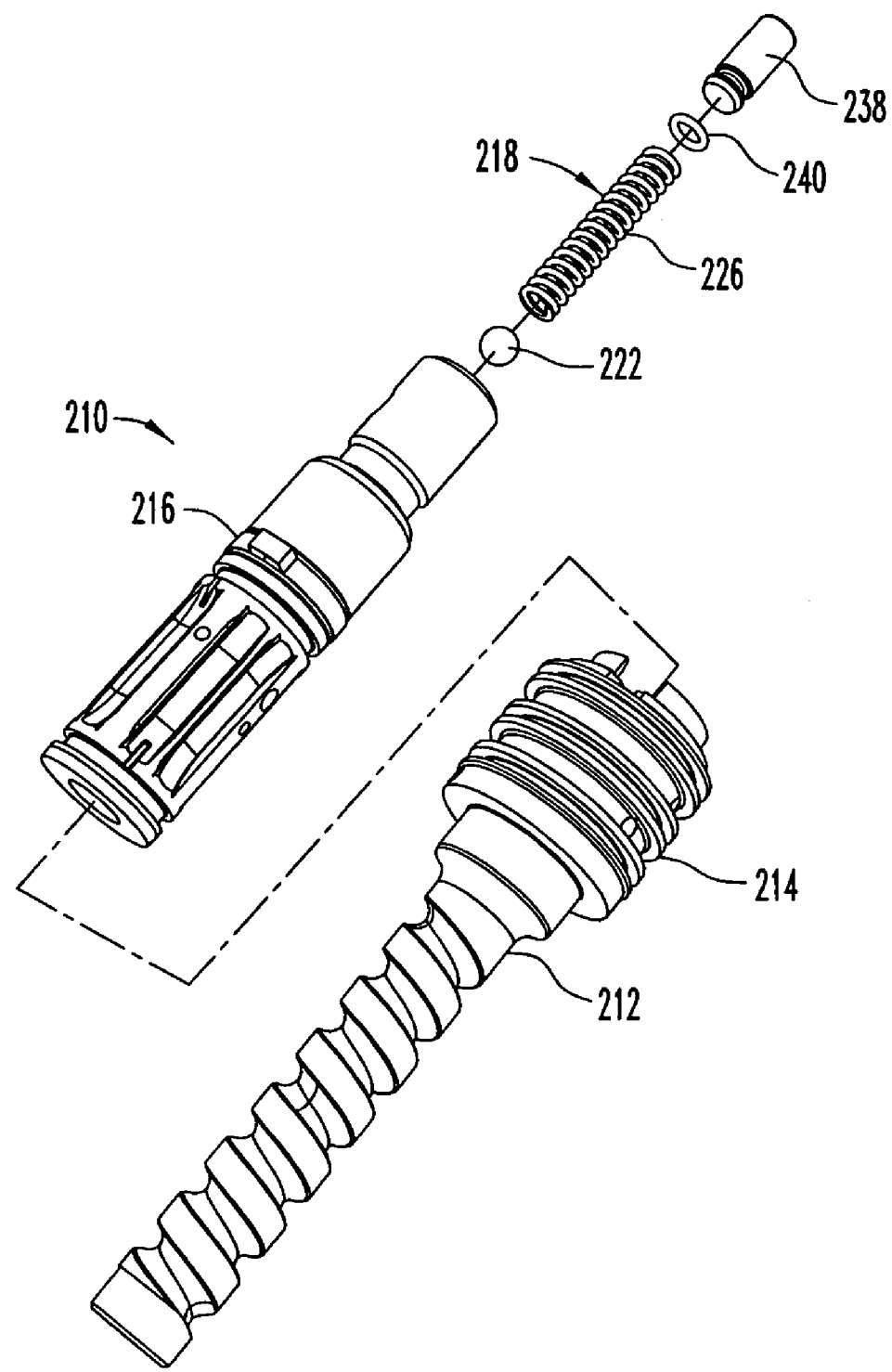
FIG. 12 is an exploded view of a second embodiment control valve in accordance with the present invention.
Figure 17:
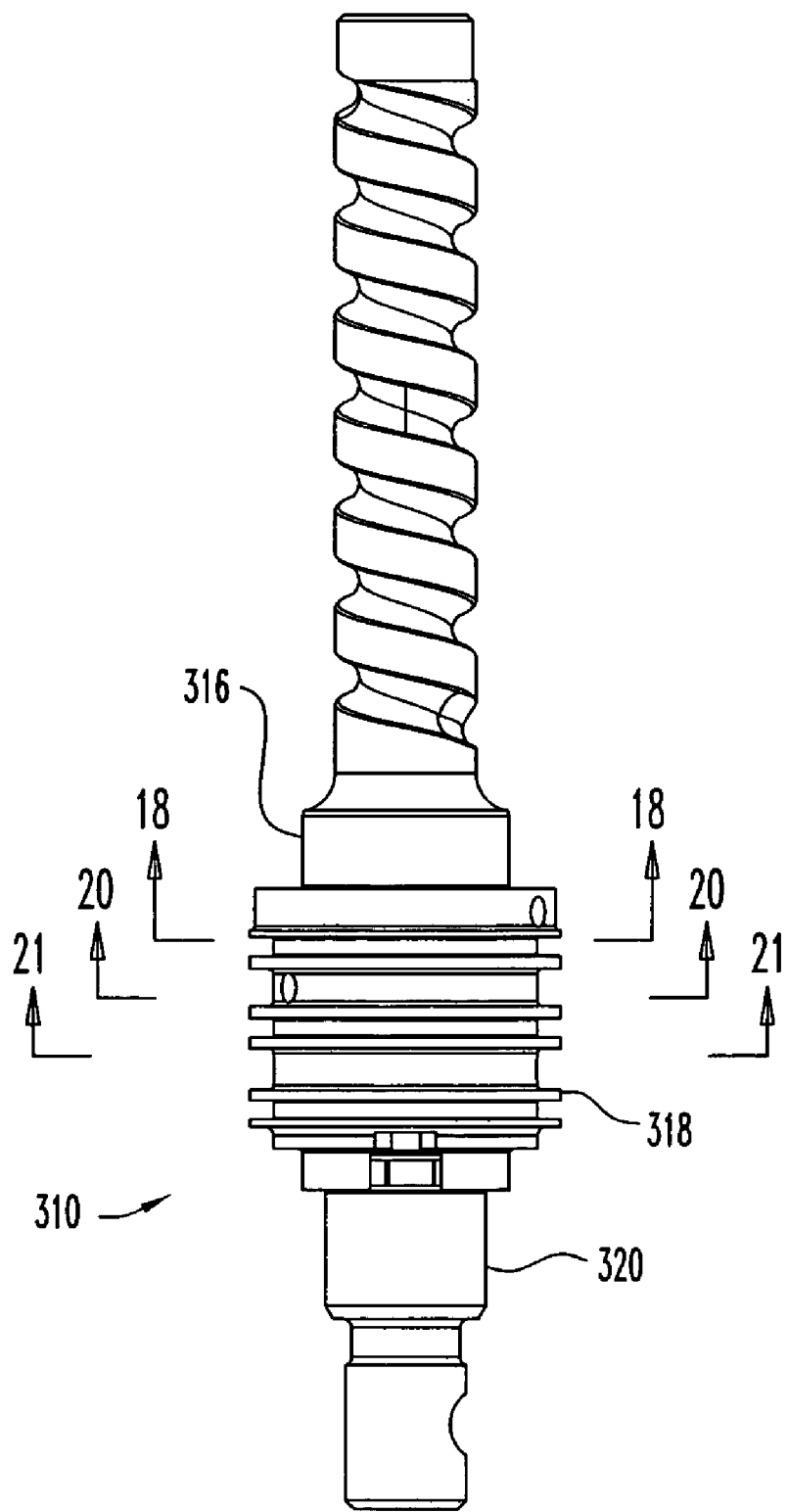
FIG. 17 is a side view of a third embodiment control valve in accordance with the present invention.

FIG. 11 is similar to FIG. 10 but illustrates fluid circuits 88, 90 when valve core 58 is rotated clockwise. Intermediate pressure zones 158 in each circuit are fluidly connected by equalization passage 122. Equalization passage 120 fluidly connects the low pressure zones. Passages 120, 122 cooperate to effectively eliminate stiction of the control valve 10 regardless of the direction the steering wheel is turned.

In the illustrated embodiment equalization passages 120, 122 are diametral through-bores contained entirely within valve core 58. In other embodiments the equalization passages can be formed entirely or partly in valve sleeve 56, or could include conduits that extend out of the valve housing to fluidly connect the intermediate pressure zones.

Control valve 10 defines a pair of fluid circuits 88, 90 arranged in parallel between the valve sleeve and the valve core to flow fluid between the control valve and the hydraulic motor 18. In other embodiments additional fluid circuits could be defined that preferably extend symmetrically around the valve core. Equalization passages functionally equivalent to illustrated passages 120 and 122 would interconnect the corresponding intermediate pressure zones of the additional circuits to ensure equalized pressure as described.

Bearing cap 32 is conventional and includes a pressure relief cartridge 162 (shown in FIG. 1) mounted on one side of the cap. A normally-closed pressure relief valve (not shown) is mounted in the cartridge 162 and is located in a bypass circuit (not shown) that connects inlet passage 48 and outlet passage 50 in parallel with the control valve 10. In the event of an overpressure from the pump 14, the pressure relief valve opens. Fluid flows through the bypass circuit and bypasses the control valve 10. This limits the operating pressure of the steering gear and prevents an overpressure from being delivered to the hydraulic motor 18 from control valve 10.

The location of cartridge 162 in bearing cap 32 can vary according to vehicle manufacturers' requirements. Moreover, some manufacturers eliminate the pressure relief valve and so cartridge 162 is omitted in some systems. As a result, a number of otherwise identical bearing caps 32 must be manufactured and kept in inventory.

FIGS. 12–16 illustrate part of a second embodiment control valve 210 in accordance with the present invention. Control valve 210 includes an outer valve member 212, like valve member 66, with valve sleeve 214 like valve sleeve 56. Valve core 216 includes a pressure relief valve 218 carried within it. By placing the pressure relief valve in the control valve 210, pressure relief cartridge 162 and its associated bypass circuit can be eliminated from bearing cap 32.

Valve core 216 is similar to valve core 58 and so only the differences will be discussed. A bypass passage 220 extends through the valve core 216 and connects the inlet ports with the exhaust ports in valve sleeve 214. Bypass passage 220 is arranged in parallel with the fluid circuits corresponding to fluid circuits 88, 90 during valve operation.

Pressure relief valve 218 is located in bypass passage 220 and includes a valving member 222. Illustrated valving member 222 is formed as a steel ball bearing but other shapes and materials for the valving member can be used. Valving member 222 is movable between a closed position against a valve seat 224 formed in the bypass passage and an opened position away from the valve seat. Spring member 226, formed as a coil compression spring, urges the valving member 222 against the valve seat 224.

Bypass passage 220 includes a first bore 228 and a second bore 230 that each extends into the valve core 216. Bore 228 is axially aligned with the valve sleeve inlet ports and receives flow from the inlet ports. Bore 230 is axially spaced from bore 228 and is aligned with the valve sleeve exhaust ports to discharge flow to the exhaust ports. Bores 228 and 230 are circuferentially offset 90 degrees from each other to be adjacent to the inlet and exhaust ports respectively.

A third bore 232 extends axially into the valve core 216 from steering wheel end 234 and intersects first and second bores 228 and 230. Valve seat 224 is formed in bore 232 between bores 228 and 230. Blind bore 236 extends axially into the valve core 216 from the opposite end of the valve core to receive an end of the torsion bar in a conventional manner.

Spring 226 is captured in bore 232 between the valving member 222 and a plug 238 that carries O-ring seal 240 sealingly closing bore 232. The axial position of plug 238 can be varied as desired to change the preload of spring 226 against the valving member 222. Spring 226 applies sufficient force against valving member 222 to maintain the pressure relief valve in a closed condition under normal operating pressures.

In the event of an overpressure, fluid attempting to flow through bypass passage 228 overcomes the force of spring 226. This moves valving member 222 away from valve seat 224 and opens pressure relief valve 218. Flow through bypass passage 220 essentially bypasses the fluid circuits defined between valve sleeve 214 and valve core 216, thereby relieving an overpressure condition.

Pressure relief valve 218 can be modified or eliminated for different power steering systems without modifying bearing cap 32 and without modifying other components of the power steering system. For example, the length, spring rate, or preload of spring 226 can be modified to change the preload against valving member 222 for different operating pressures without changing the size of valve sleeve 214 or valve core 216. This enables identical bearing caps 32 to be used in different power steering systems and yet fully satisfy manufacturers' requirements.

The exhaust orifices defined in control valves 10, 210 extend substantially along the full axial length of the valve core lands defining the orifices. Fluid between the exhaust orifices is essentially circumferential flow without a substantial axial flow component.

FIGS. 17–21 illustrate a third embodiment control valve 310 in accordance with the present invention. Control valve 310 is similar to control valve 10 and defines a pair of fluid circuits 312, 314 (see FIG. 18) similar to fluid circuits 88, 90. The fluid in the intermediate pressure zones of control valve 10 does no work and is not discharged to the hydraulic motor. This provides the opportunity in control valve 310 to place additional flow restrictions in the intermediate pressure zones, without reducing pressure to the hydraulic motor and without increasing backpressure in the hydraulic steering system. These additional flow restrictions can be included in the mathematical model previously described to optimize exhaust orifice areas and closing rates.

Control valve 310 includes an outer member 316 having a valve sleeve 318, and a valve core 320. See FIG. 17. Valve sleeve 318 and valve core 320 are similar to valve sleeve 56 and valve core 58, so only the differences will be discussed in detail.

Figure 18:
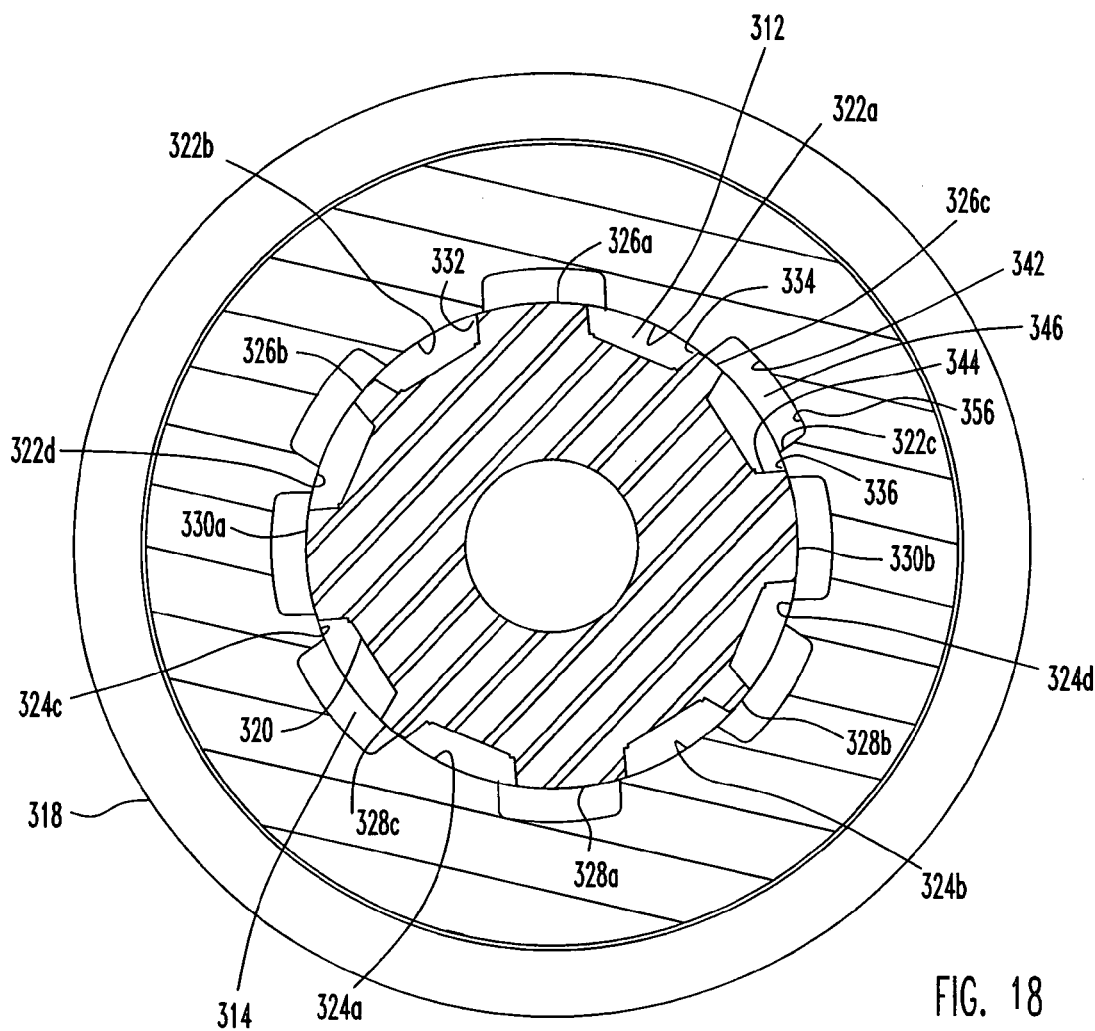
FIG. 18 is a sectional view taken along line 18-18 of FIG. 17, the control valve in an off-center condition.

As shown in FIG. 18, valve sleeve 318 includes lands 322a, 322b, 322c, and 322d associated with fluid circuit 312 and lands 324a, 324b, 324c, and 324d associated with fluid circuit 314. Lands 322a–d and 324a–d are sized and spaced like lands 100a–d and 102a–d of valve sleeve 56.

Valve core 320 includes lands 326a, 326b, and 326c associated with fluid circuit 312 and lands 328a, 328b, and 328d associated with fluid circuit 314. Valve core lands 330a and 330b are shared between the circuits. Lands 326a-c, 328a-c, and 330a-b are sized and spaced like respective lands 110a-c, 112a-c, and 114a-b of valve core 58.

FIG. 18 illustrates control valve 310 in an off-center condition. Valve core 320 is rotated counterclockwise with respect to valve sleeve 318 as viewed in the drawing. Lands 322b and 326a define pressure orifice 332. Lands 322a and 326c define upstream exhaust orifice 334 and lands 322c and 330b define downstream exhaust orifice 336. Counterclockwise rotation closes orifices 332, 334, and 336 in fluid circuit 312, and corresponding orifices (not numbered) in fluid circuit 314. It is understood that clockwise rotation opens these orifices and closes the other pressure and exhaust orifices in the fluid circuits as previously described for control valve 10. The valve curve of control valve 310 is similar to the valve curve of control valve 10.

Features of orifices 334 and 336 and in the intermediate pressure zone between the orifices will be discussed in detail below, it being understood that the discussion is applicable to corresponding features found in the other branch of fluid circuit 312 and both branches of fluid circuit 314.

Figure 19:
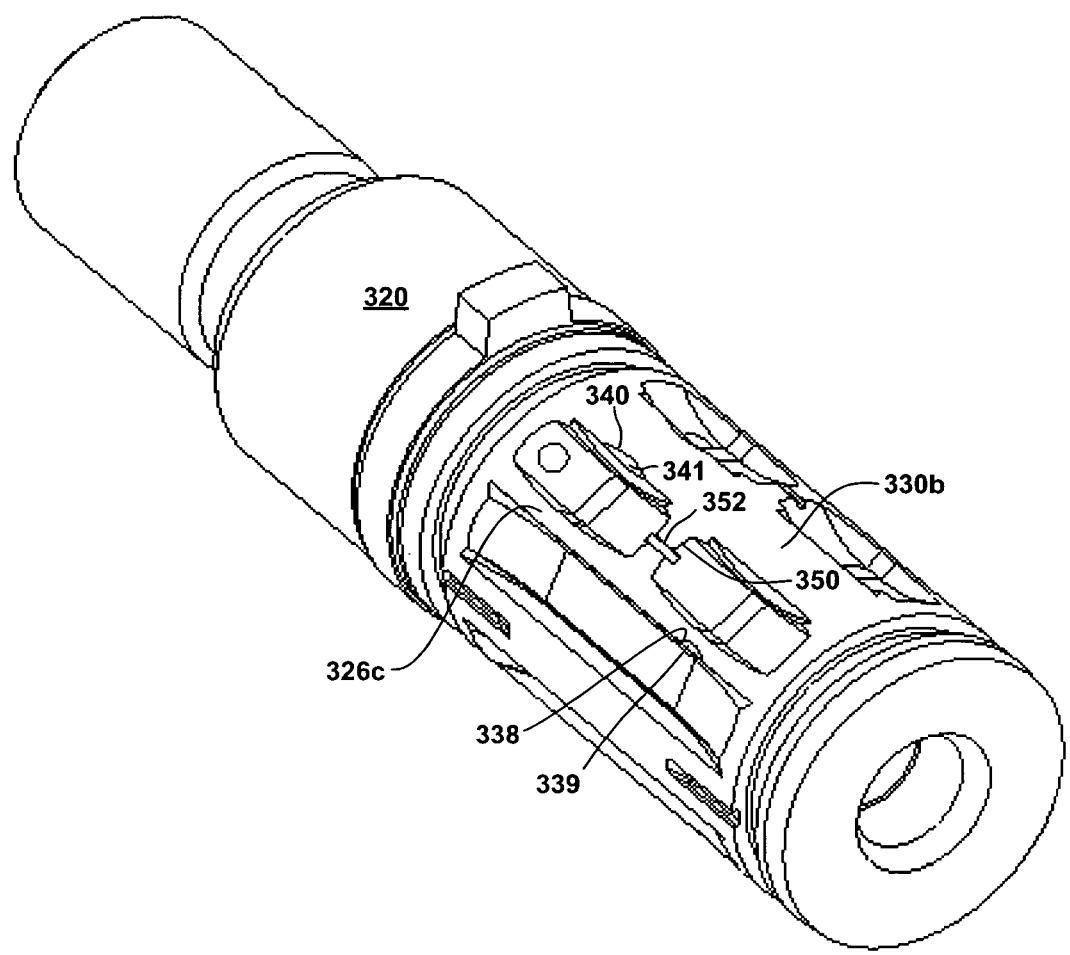
FIG. 19 is a perspective view of the valve core of the control valve shown in FIG. 17.
Figure 20:
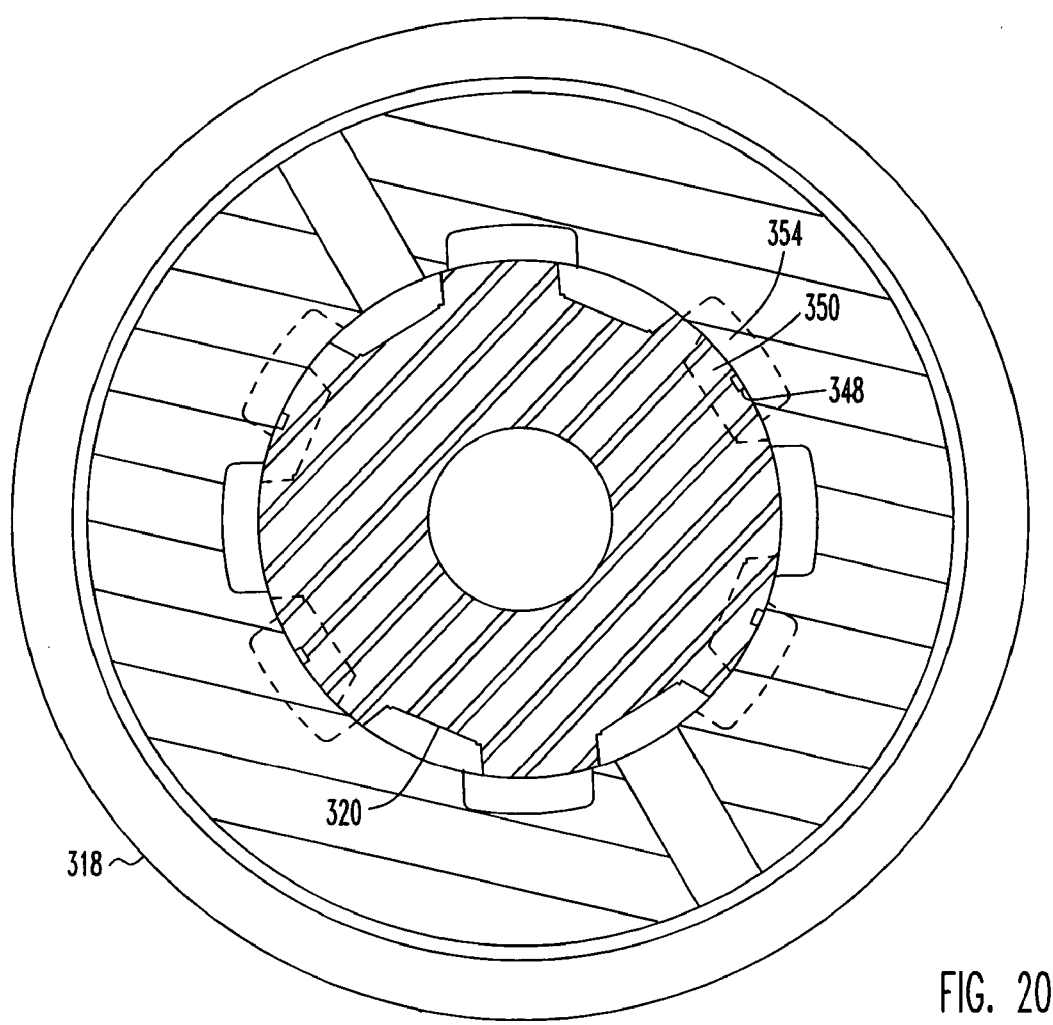
FIG. 20 is a sectional view similar to FIG. 18 but taken along line 20—20 of FIG. 17.
Figure 21:
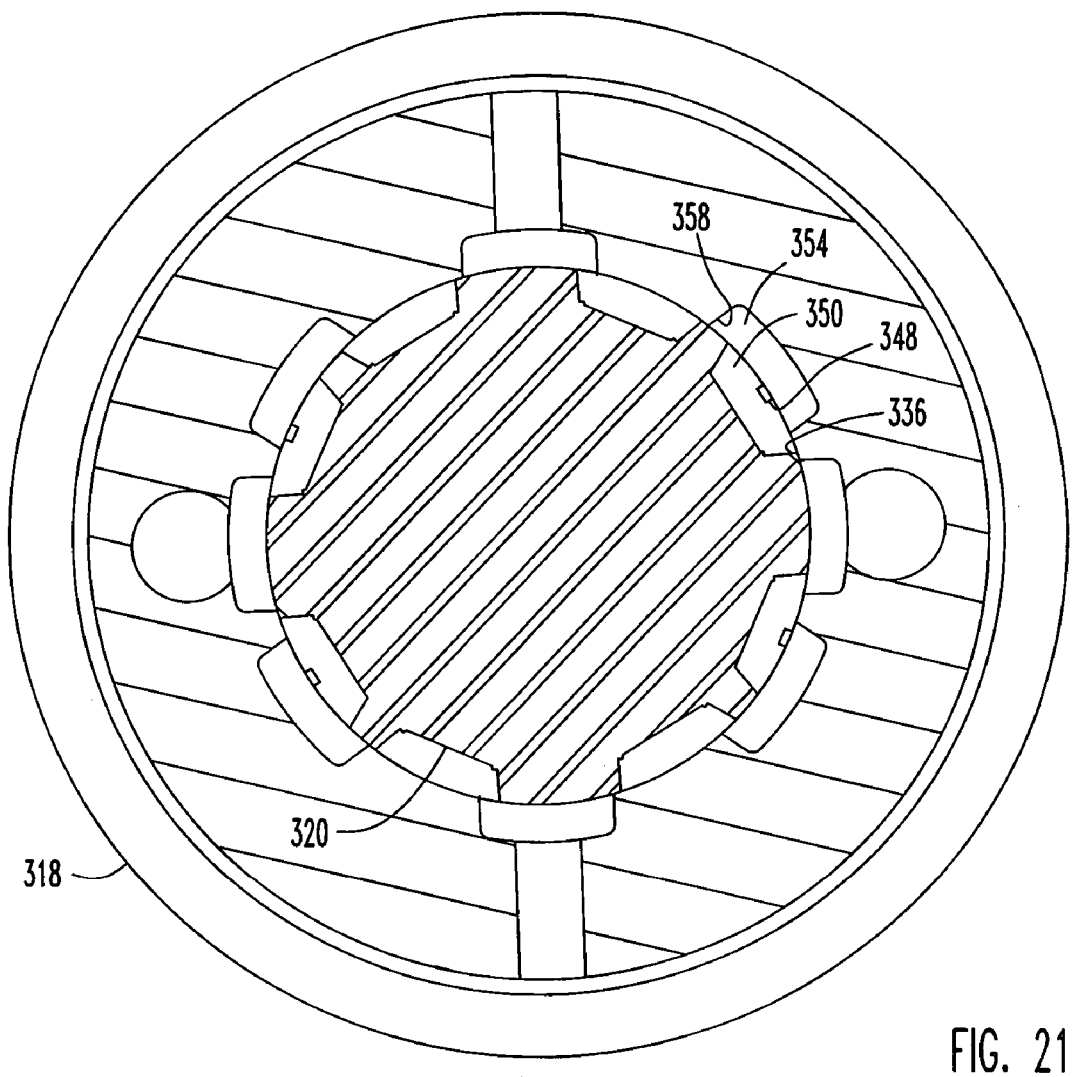
FIG. 21 is a sectional view similar to FIG. 18 but taken along line 21—21 of FIG. 17.
Figure 5:
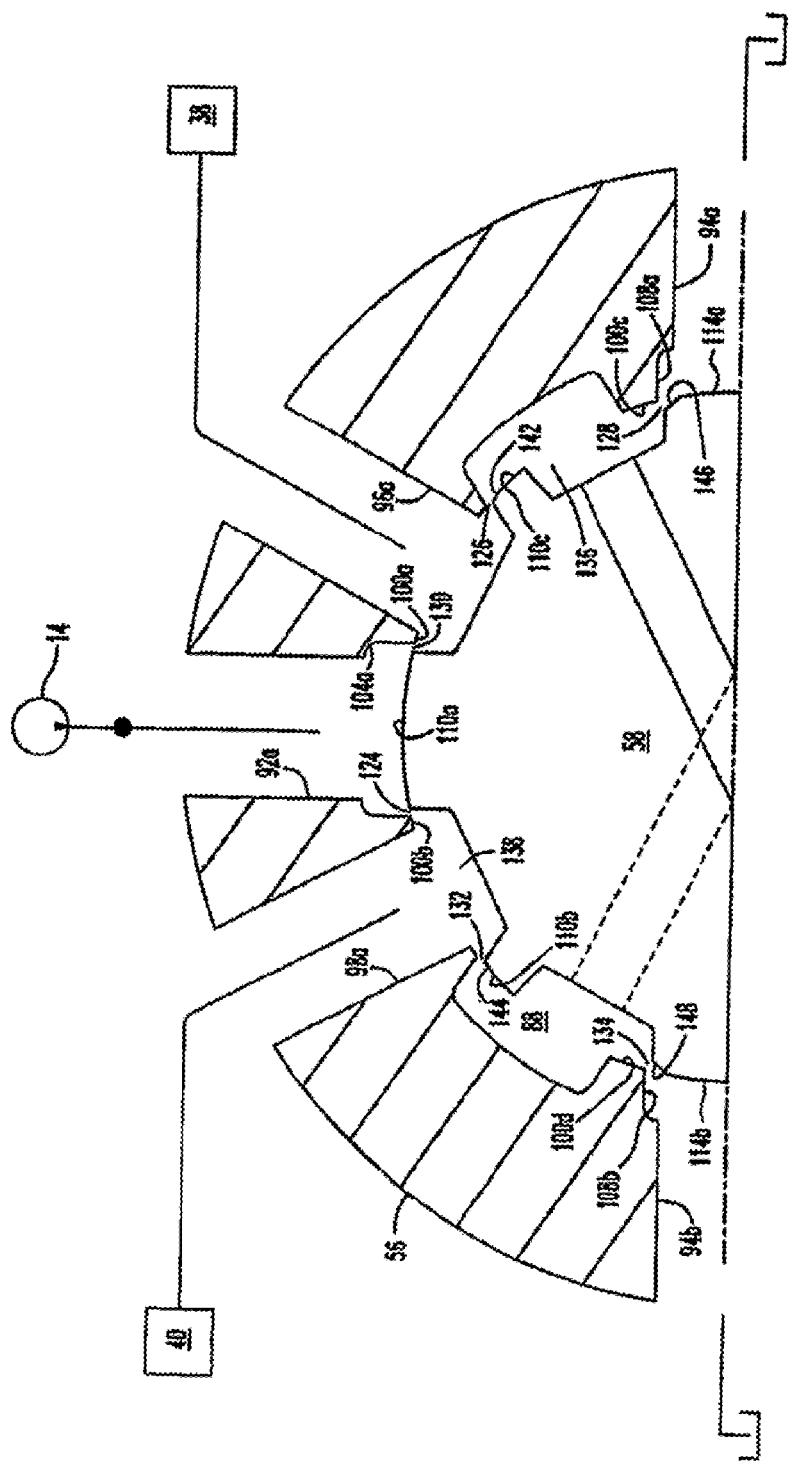

FIG. 19 illustrates valve core 320. Land 326c has a control edge 338 corresponding to control edge 142 of control valve 10. Control edge 338 is adjacent the inner end of the valve core and extends axially only a relatively short distance along the land. This is unlike control edge 142, which extends substantially the full length of the land. Control edge 338 defines a groove 339 in land 326c that extends circumferentially into the land.

Land 330b has a control edge 340 corresponding to control edge 146 of control valve 10. Control edge 340 extends axially a relatively short distance along land 330b and is axially spaced from control edge 338 towards the steering wheel end of the control valve. Control edge 340 defines a groove 341 in land 330a that extends circumferentially into the land.

Referring back to FIG. 18, orifices 334 and 336 essentially function identically like corresponding orifices 126 and 128 when control valve 310 is in the centered condition. Pairs of sleeve/core lands 322a/326c and 322c/330b are spaced away from each other and flow through orifices 334 and 336 is essentially circumferential along the entire axial length of the lands.

When valve core 320 rotates to the off-center position shown, the leading edges of core lands 326c and 330b come beneath respective sleeve lands 322a and 322c. Flow through orifice 334 is limited by the overlapping lands to circumferential flow through groove 339, and flow through orifice 336 is limited by the overlapping lands to circumferential flow through groove 341 (less any leakage between lands). Control edges 338 and 340 are configured such that the flow areas and closing rates of orifices 334 and 336 essentially equal the flow areas and closing rates of corresponding orifices 126 and 128 in control valve 10.

Sleeve groove 342 and core groove 344 cooperate to define an axial flow channel 346 extending from orifice 334 to orifice 336 containing the intermediate pressure zone between orifices. Circumferential flow discharged from orifice 334 is forced to flow axially through channel 346 to orifice 336. Axial flow through channel 346 is forced back to circumferential flow through orifice 336.

Changing the direction of flow between orifices 334 and 336 generates additional pressure drops in the intermediate pressure zone at the discharge from orifice 334 and at the entrance to orifice 336. These additional pressure drops are in series with the pressure drops through exhaust orifices 334 and 336, and help reduce noise and the likelihood of cavitation through the orifices.

Control valve 310 also includes an additional axial orifice 348 (see FIG. 20) in the intermediate pressure zone described in greater detail below. Flow through orifice 348 generates an additional pressure drop that further aids in reducing noise and the likelihood of cavitation in control valve 310.

As shown in FIG. 19, circumferential wall 350 extends between core lands 326c and 330b. Wall 350 is about midway between control edges 338 and 340 and blocks core groove 342. An axial slot 352 open at the top of the wall extends through the wall thickness. Valve sleeve 318 includes a circumferential wall 354 that extends between sleeve lands 322a and 322c and blocks sleeve groove 346. See FIGS. 20 and 21.

Wall 354 overlays wall 350 and covers slot 352 to define the fixed-area orifice 348. The walls 350, 354 divide the intermediate pressure zone into an upstream zone 356 receiving fluid from upstream exhaust orifice 334 and a reduced-pressure downstream zone 358 flowing fluid to downstream exhaust orifice 336. An equalization passage interconnects the downstream zones in the two circuits, and an equalization passage interconnecting the upstream zones can be provided.

Flow through channel 346 must pass through orifice 348, reducing fluid pressure and thereby reducing noise. The size and shape of orifice 348 can be modified from the illustrated embodiment to achieve the desired pressure drop and flow rate, and additional orifices 348 can be provided in channel 346.

In alternative embodiments of control valve 310, flow channel 346 can flow fluid radially between the exhaust orifices. For example, radial bores in valve core 320 having axially-spaced intake and discharge ends can be provided that flow fluid between the exhaust orifices. Flow must change radial direction, and the change in radial direction causes additional pressure drop. The bores themselves can form or include flow restrictions that also generate a pressure drop between exhaust orifices.

Illustrated control valves 10, 210 and 310 define a pair of fluid circuits arranged in parallel between the valve sleeve and the valve core to flow fluid between the control valve and the hydraulic motor. In yet other embodiments of the present invention the inner and outer valve members can define only a single fluid circuit within the control valve. Such control valves are generally not preferred for power steering applications because of their inherent load imbalance, but could be practical in other applications.

Control valves in accordance with the present invention can also be used in rack-and-pinion power steering systems or to control flow to hydraulic components in other types of hydraulic systems.

Control valves in accordance with the present invention are preferably formed as rotary control valves, with inner and outer valve members co-axially mounted for relative rotation about an axis of rotation. Other possible embodiments of control valves in accordance with the present invention could be formed as longitudinal control valves, in which the inner and outer valve members are co-axially mounted for relative translation along an axis.

While we have illustrated and described preferred embodiments of our invention, it is understood that this is capable of modification, and we therefore do not wish to be limited to the precise details set forth, but desire to avail ourselves of such changes and alterations as fall within the purview of the following claims.

What we claim as our invention is:

1. A hydraulic steering system for turning steerable wheels of a vehicle, the system comprising:
   an output member movable to effect turning the steerable wheels of the vehicle;
   a hydraulic motor for moving the output member, the motor having first and second fluid chambers;
   a pump for supplying fluid to the motor from a fluid source;
   a control valve for controlling fluid flow between the pump and the motor; and
   conduits providing fluid communication between the motor and the pump and the control valve;
   the control valve comprising an outer valve member and an inner valve member, the inner and outer valve members supported in a housing for relative rotation about an axis between a centered condition of the control valve and a closed condition of the control valve, means for biasing the inner and outer valve members to the centered condition, an inlet passage for flowing fluid from the pump into the control valve and an exhaust passage for flowing fluid out of the control valve to the fluid source;
   the outer valve member comprising an inner periphery and the inner valve member comprising an outer periphery adjacent to the inner periphery of the outer valve member, the inlet passage flowing fluid to the inner periphery of the outer valve member, the exhaust passage flowing fluid from the inner periphery of the outer valve member;
   the inner and outer peripheries of the valve members defining first and second flow passages between the valve members, said flow passages arranged in parallel and fluidly connecting the inlet passage and the exhaust passage;
   the control valve further comprising a first motor passage extending from the first flow passage for flowing fluid between the first flow passage and the first motor chamber, and a second motor passage extending from the second flow passage for flowing fluid between the second flow passage and the second motor chamber;
   the inner periphery of the outer valve member and the outer periphery of the inner valve member defining a plurality of flow orifices, each orifice being variable in flow area in response to relative rotation of the inner valve member in a first direction from the centered condition to the closed condition;
   the plurality of orifices comprising a pressure orifice in the second flow passage between the inlet passage and the second motor passage, the pressure orifice closing upon movement of the control valve in the first direction to flow fluid from the control valve to the first motor chamber and to flow fluid from the second motor chamber to the control valve for movement of the steering member;

the plurality of orifices comprising first and second exhaust orifices in series in the first flow passage, the first exhaust orifice between the first motor passage and the exhaust passage, the second exhaust orifice between the first exhaust orifice and the exhaust passage;

each of the first and second exhaust orifices closing upon movement of the control valve in the first direction from the centered condition to the closed condition, the exhaust orifices closing to an essentially fully closed condition at about the same movement of the control valve from the centered condition to the closed condition; and the second exhaust orifice having a substantially larger flow area than the first exhaust orifice when the control valve is not in the closed position.

2. The hydraulic steering system of claim 1 wherein the pressure orifice closes to an essentially fully closed condition substantially before the first exhaust orifice closes as the control valve moves from the centered condition to the closed condition.

3. The hydraulic steering system of claim 1 wherein the second exhaust orifice closes at a substantially constant rate as the control valve moves from the centered condition to the closed condition.

4. The hydraulic steering system of claim 1 wherein:

the inner valve member is relatively rotatable in the first direction from the centered condition to a first operating condition of the control valve, and from the first operating condition to the closed condition of the control valve; and the first exhaust orifice closes relatively rapidly as the control valve moves from the centered condition to the first operating condition and closes relatively slowly as the control valve moves from the first operating condition to the closed condition.

5. The hydraulic steering system of claim 4 wherein:

the first exhaust orifice closes at a substantially constant first rate as the control valve moves from the centered condition to the first operating condition and closes at a substantially constant second rate as the control valve moves from the first operating condition to the closed condition.

6. The hydraulic steering system of claim 4 wherein:

the first and second exhaust orifices each close at a respective substantially constant rate as the control valve moves from the first operating condition to the closed condition.

7. The hydraulic steering system of claim 6 wherein the closing rate of the second exhaust orifice is approximately three times greater than the closing rate of the first exhaust orifice.

8. The hydraulic steering system of claim 4 wherein the pressure orifice is in an essentially fully closed condition when the control valve is in the first operating condition.

9. The hydraulic steering system of claim 1 wherein the pressure orifice is effectively the sole orifice in the second flow passage as the control valve is moved from the centered condition to the closed condition.

10. The hydraulic steering system of claim 1 wherein said periphery of each of the inner and outer valve members comprises a plurality of lands and grooves, the lands and grooves of the valve members cooperating to form said orifices.

11. The hydraulic steering system of claim 10 wherein the plurality of lands and grooves of the inner valve member comprises a first land associated with the first exhaust orifice and a second land associated with the second exhaust orifice; and each of the first and second lands comprises a respective control edge for varying the flow area of the orifice associated with the land.

12. The hydraulic steering system of claim 11 wherein each control edge comprises a substantially flat surface.

13. The hydraulic steering system of claim 12 wherein the surface associated with the first exhaust orifice is inclined at a first inclination angle and the surface associated with the second exhaust orifice is inclined at a second inclination angle substantially different from the first angle.

14. The hydraulic steering system of claim 1 wherein said flow paths, said orifices and said motor passages represent a fluid circuit, and the control valve comprises a plurality of like fluid circuits arranged in parallel fluidly connecting the inlet passage and the return passage.

15. The hydraulic steering system of claim 14 wherein the plurality of fluid circuits comprise a first fluid circuit and a second fluid circuit, the first and second exhaust orifices of each of said first and second fluid circuits defining between them a portion of the first flow path of such circuit; and the control valve comprises an additional flow passage fluidly connecting said flow path portions whereby the fluid pressures in the flow path portions are substantially equalized with each other.

16. The hydraulic steering system of claim 1 wherein the control valve comprises a pressure relief valve mounted in the inner valve member.

17. The hydraulic steering system of claim 1 wherein the inner valve member is rotatable from the centered condition to an off-center condition of the control valve; and the control valve comprises structure defining a flow restriction in the first flow passage between the first and second exhaust orifices when the inner valve member is in the off-center condition;

whereby the inlet pressure at the second exhaust orifice is reduced from the discharge pressure at the first exhaust orifice by the flow restriction.

18. A control valve suitable for controlling a fluid motor having first and second fluid chambers, the valve comprising:

a housing;

an outer valve member and an inner valve member, the inner and outer valve members supported in the housing for relative motion in a first direction from a neutral condition of the control valve and a closed condition of the control valve;

an inlet passage for flowing fluid into the control valve and an exhaust passage for flowing fluid out of the control valve;

the inner and outer valve members arranged to define first and second flow passages between the valve members, the first and second flow passages arranged in parallel and fluidly connecting the inlet passage and the exhaust passage;

the control valve further comprising a first motor passage extending from the first flow passage for flowing fluid between the first flow passage and the first motor chamber, and a second motor passage extending from the second flow passage for flowing fluid between the second flow passage and the second motor chamber;

the inner and outer valve members cooperating to define a pressure orifice, a first exhaust orifice, and a second exhaust orifice in the first and second flow passages, each orifice being variable in flow area in response to motion of the inner valve member in the first direction;

the pressure orifice in the second flow passage between the inlet passage and the second motor passage, the first and second exhaust orifices in series in the first flow passage, the first exhaust orifice between the first motor passage and the exhaust passage, the second exhaust orifice between the first exhaust orifice and the exhaust passage;

each of the first and second exhaust orifices closing upon movement of the control valve in the first direction, the exhaust orifices closing to an essentially fully closed condition at about the same movement of the control valve from the neutral condition to the closed condition; and the second exhaust orifice having a substantially larger flow area than the first exhaust orifice when the first and second orifices are between the neutral and closed conditions.

19. The control valve of claim 18 wherein the pressure orifice closes to an essentially fully closed condition substantially before the first exhaust orifice closes as the control valve moves from the neutral position to the closed position.

20. The control valve of claim 18 wherein the second exhaust orifice closes at a substantially constant rate as the control valve moves from the neutral condition to the closed condition.

21. The control valve of claim 18 wherein:

the inner valve member is relatively movable in the first direction from the neutral condition to a first operating condition of the control valve, and from the first operating condition to the closed condition of the control valve; and the first exhaust orifice closes relatively rapidly as the control valve moves from the neutral condition to the first operating condition and closes relatively slowly as the control valve moves from the first operating condition to the closed condition.

22. The control valve of claim 21 wherein:

the first exhaust orifice closes at a substantially constant first rate as the control valve moves from the neutral condition to the first operating condition and closes at a substantially constant second rate as the control valve moves from the first operating condition to the closed condition.

23. The control valve of claim 21 wherein:

the first and second exhaust orifices each close at a respective substantially constant rate as the control valve moves from the first operating condition to the closed condition.

24. The control valve of claim 23 wherein the closing rate of the second exhaust orifice is approximately three times greater than the closing rate of the first exhaust orifice.

25. The control valve of claim 21 wherein the pressure orifice is in an essentially fully closed condition when the control valve is in the first operating condition.

26. The control valve of claim 18 wherein the second flow passage is essentially unobstructed between the pressure orifice and the exhaust passage as the control valve is moved from the neutral condition to the closed condition.

27. The control valve of claim 18 wherein the inner and outer valve members are mounted for relative rotation about an axis of rotation.

28. The control valve of claim 18 wherein said flow paths, said orifices and said motor passages represent a fluid circuit, and the control valve comprises a plurality of like fluid circuits arranged in parallel fluidly connecting the inlet passage and the return passage.

29. The control valve of claim 28 wherein the plurality of fluid circuits comprise a first fluid circuit and a second fluid circuit, the first and second exhaust orifices of each of said first and second fluid circuits defining between them a portion of the first flow path of such circuit; and the control valve comprises an additional flow passage fluidly connecting said flow path portions whereby the fluid pressures in the flow path portions are substantially equalized with each other.

30. The control valve of claim 18 comprising a pressure relief valve within the housing.

31. The control valve of claim 18 wherein the control valve comprises structure defining a flow restriction in the first flow passage between the first and second exhaust orifices when the inner valve member is in an off-center condition whereby the inlet pressure at the second exhaust orifice is reduced from the discharge pressure at the first exhaust orifice by the flow restriction.

32. A hydraulic steering system for turning steerable wheels of a vehicle, the system comprising:

an output member movable to effect turning the steerable wheels of the vehicle;

a hydraulic motor for moving the output member, the motor having first and second fluid chambers;

a pump for supplying fluid to the motor from a fluid source;

a control valve for controlling fluid flow between the pump and the motor; and conduits providing fluid communication between the motor and the pump and the control valve;

the control valve comprising an outer valve member and an inner valve member, the inner and outer valve members supported in a housing for relative rotation about an axis from a centered condition of the control valve, means for biasing the inner and outer valve members to the centered condition, an inlet passage for flowing fluid from the pump into the control valve and an exhaust passage for flowing fluid out of the control valve to the fluid source;

the outer valve member comprising an inner periphery and the inner valve member comprising an outer periphery adjacent to the inner periphery of the outer valve member, the inlet passage flowing fluid to the inner periphery of the outer valve member, the exhaust passage flowing fluid from the inner periphery of the outer valve member;

the inner and outer peripheries of the valve members defining first and second fluid circuits between the valve members, said fluid circuits arranged in parallel and fluidly connecting the inlet passage and the exhaust passage;

each fluid circuit comprising first and second flow passages arranged in parallel and fluidly connecting the inlet passage and the exhaust passage, a first motor passage for flowing fluid between the first flow passage and the first motor chamber, and a second motor passage for flowing fluid between the second flow passage and the second motor chamber;

the inner periphery of the outer valve member and the outer periphery of the inner valve member defining a first plurality of flow orifices, each orifice being variable in flow area in response to relative rotation of the inner valve member in a first direction from the centered condition of the control valve;

the first plurality of orifices comprising a pressure orifice in each second flow passage between the inlet passage and the second motor passage of the respective second flow passage, the pressure orifice closing upon movement of the control valve in a first direction from the centered condition to flow fluid from the control valve to the first motor chamber and to flow fluid from the second motor chamber to the control valve for movement of the steering member;

the first plurality of orifices comprising first and second exhaust orifices in series in each first flow passage, the first and second exhaust orifices between the first motor passage and the exhaust passage of the respective first flow passage, the first and second exhaust orifices defining between them a flow path portion of such circuit; and the control valve comprises an equalization passage fluidly connecting the flow path portions of the first and second fluid circuits whereby the fluid pressures in the flow path portions are substantially equalized with each other despite variations in orifice sizes caused by manufacturing tolerances.

33. The control valve of claim 32 wherein the equalization passage is contained entirely within the housing.

34. The control valve of claim 32 wherein the equalization passage is formed in the inner valve member.

35. The control valve of claim 34 wherein the equalization passage comprises a bore extending through the inner valve member, the bore comprising openings at opposite ends of the bore on the outer periphery of the inner valve member.

36. The control valve of claim 35 wherein the bore extends along a diameter of the inner valve member.

37. The control valve of claim 32 wherein the equalization passage represents a first equalization passage and the flow path portions represent first flow path portions;

the inner periphery of the outer valve member and the outer periphery of the inner valve member define a second plurality of flow orifices, each orifice of the second plurality of orifices being variable in flow area in response to relative rotation of the inner valve member in a second direction from the centered condition of the control valve;

the second plurality of orifices comprising a pressure orifice in each first flow passage between the inlet passage and the first motor passage of the respective first flow passage, the pressure orifice closing upon movement of the control valve in a second direction from the centered condition to flow fluid from the control valve to the second motor chamber and to flow fluid from the first motor chamber to the control valve for movement of the steering member;

the second plurality of orifices comprising first and second exhaust orifices in series in each second flow passage, the first and second exhaust orifices between the second motor passage and the exhaust passage of the respective second flow passage, the first and second exhaust orifices defining between them a second flow portion of such circuit; and the control valve comprises a second equalization passage fluidly connecting the second flow path portions of the first and second fluid circuits whereby the fluid pressures in the second flow path portions are substantially equalized with each other despite variations in orifice sizes caused by manufacturing tolerances.

38. The control valve of claim 37 wherein the inner valve member extends along an axis and the first and second equalization passages are axially spaced from each other.

39. The control valve of claim 37 wherein the first and second equalization passages are each contained within the housing.

40. The control valve of claim 39 wherein the first and second equalization passages are each formed in the inner valve member.

41. A control valve suitable for controlling a hydraulic motor having first and second fluid chambers, the valve comprising:
a housing;
an outer valve member and an inner valve member, the inner and outer valve members supported in the housing for relative motion in a first direction from a neutral position of the control valve;
an inlet passage for flowing fluid into the control valve and an exhaust passage for flowing fluid out of the control valve;
the inner and outer valve members arranged to define first and second flow circuits between the valve members, the flow circuits arranged in parallel and fluidly connecting the inlet passage and the exhaust passage;
each flow circuit comprising first and second flow passages arranged in parallel and fluidly connecting the inlet passage and the exhaust passage, a first motor passage for flowing fluid between the first flow passage and the first motor chamber, and a second motor passage for flowing fluid between the second flow passage and the second motor chamber;
the inner and outer valve members cooperating to define a pressure orifice, a first exhaust orifice, and a second exhaust orifice in the first and second flow passages of each flow circuit, each orifice being variable in flow area in response to motion of the inner valve member in the first direction;
the pressure orifice in each second flow passage between the inlet passage and the second motor passage of the second flow passage, the first and second exhaust orifices in each first flow passage in series between the first motor passage of the first flow passage and the exhaust passage, the first and second exhaust orifices defining between them a flow path portion of the flow circuit containing the first and second exhaust orifices; and
the control valve comprises an equalization passage fluidly connecting the flow path portions of the first and second flow circuits whereby the fluid pressures in the flow path portions are substantially equalized with each other despite variations in orifice sizes caused by manufacturing tolerances.

42. The control valve of claim 41 wherein the equalization passage is contained entirely within the housing.

43. The control valve of claim 41 wherein the equalization passage represents a first equalization passage and the flow path portions represent first flow path portions;

the inner periphery of the outer valve member and the outer periphery of the inner valve member define a second plurality of flow orifices, each orifice of the second plurality of orifices being variable in flow area in response to relative rotation of the inner valve member in a second direction from the neutral condition of the control valve;

the second plurality of orifices comprising a pressure orifice in each first flow passage between the inlet passage and the first motor passage of the respective first flow passage, the pressure orifice closing upon movement of the control valve in a second direction from the neutral condition to flow fluid from the control valve to the second motor chamber and to flow fluid from the first motor chamber to the control valve for movement of the steering member;

the second plurality of orifices comprising first and second exhaust orifices in series in each second flow passage, the first and second exhaust orifices between the second motor passage and the exhaust passage of the respective second flow passage, the first and second exhaust orifices defining between them a second flow portion of such circuit; and the control valve comprises a second equalization passage fluidly connecting the second flow path portions of the first and second fluid circuits whereby the fluid pressures in the second flow path portions are substantially equalized with each other despite variations in orifice sizes caused by manufacturing tolerances.

44. The control valve of claim 43 wherein the inner valve member extends along an axis and the first and second equalization passages are axially spaced from each other.

45. The control valve of claim 43 wherein the first and second equalization passages are each contained within the housing.

46. A control valve suitable for controlling a fluid motor having first and second fluid chambers, the valve comprising:
   a housing;
   an outer valve member and an inner valve member the inner and outer valve members supported in the housing for relative motion to operate the valve;
   an inlet passage for flowing pressurized fluid into the control valve and an exhaust passage for flowing fluid out of the control valve;
   the inner and outer valve members arranged to define a flow passage between the valve members, the flow passage fluidly connecting the inlet passage and the exhaust passage for flowing fluid through the valve;
   the control valve further comprising first and second motor passages extending from the flow passage, the first motor passage for flowing fluid between the flow passage and the first fluid chamber, the second motor passage for flowing fluid between the flow passage and the second motor chamber, and a bypass passage in the inner valve member, the bypass passage arranged in parallel with the flow passage and fluidly connecting the inlet passage and the exhaust passage; and
   a pressure relief valve in the inner valve member, the pressure relief valve comprising a valving member in the bypass passage, the valving member movable between opened and normally closed positions to open and close the pressure relief valve, and means for biasing the valving member to the closed position;
   the valving member arranged such that fluid attempting to flow through the bypass passage urges the valving member to the opened position against the biasing means so that an overpressure opens the pressure relief valve to flow fluid through the bypass passage.

47. The control valve of claim 46 wherein the pressure relief valve comprises a valve seat formed in the bypass passage, the valving member against the valve seat when in the closed position.

48. The control valve of claim 47 wherein the means for biasing the valving member comprises a spring in the bypass passage.

49. The control valve of claim 46 wherein the bypass passage comprises a first bore, a second bore, and a third bore, the first bore extending from the inlet into the inner valve member, the second bore spaced from the first bore and extending from the discharge into the inner valve member, and the third bore intersecting the first and second bores.

50. The control valve of claim 49 wherein the pressure relief valve is located in the third bore.

51. The control valve of claim 50 wherein the third bore comprises an open end portion at an end of the inner valve member, and the pressure relief valve comprises a plug sealingly closing the open end portion of the third bore.

52. The control valve of claim 51 wherein the biasing means comprises a coil spring compressed between the plug and the valve member generating a spring force urging the valve member towards the valve seat, and the plug is movable along the third bore to adjust the spring force.

53. The control valve of claim 46 wherein the inner and outer valve members cooperatively define at least one variable flow orifice in the flow passage.

54. The control valve of claim 53 wherein the inner and outer valve members are relatively movable about an axis of rotation.

55. The control valve of claim 46 comprising means for biasing the first and second valve members to a neutral position of the control valve.

56. The control valve of claim 55 wherein the means for biasing the first and second valve members comprises a torsion bar operatively connected between the inner and outer valve members.

57. A valve subassembly for a hydraulic control valve that controls the flow of fluid between the valve and a fluid machine, the subassembly comprising:
   a valve member and a pressure relief valve in the valve member, the valve member configured for relative motion within a second valve member of the control valve to operate the control valve;
   the valve member comprising first, second, and third surfaces, the first surface configured to at least partially define an inlet passage for flowing fluid into the control valve when the valve member is in the control valve, the second surface configured to at least partially define an exhaust passage for flowing fluid out of the control valve when the valve member is in the control valve, and the third surface on an outer periphery of the valve member and configured to define a flow passage fluidly connecting the inlet and exhaust passages when the valve member is in the control valve to flow fluid between the control valve and the hydraulic machine;
   the valve member comprising a bypass passage extending through the valve member, the bypass-passage comprising an inlet opening on the first surface and a discharge opening on the second surface, the bypass passage configured to fluidly connect the inlet and exhaust passages in parallel with the flow passage when the valve member is in the control valve;
   the pressure relief valve comprising a valving member in the bypass passage, the valving member movable between opened and normally closed positions to open and close the bypass passage, and means for biasing the valving member to the closed position; the valving member arranged such that fluid attempting to flow through the bypass passage urges the valving member to the opened position whereby an overpressure condition opens the pressure relief valve and fluid flowing through the control valve bypasses the flow passage.

58. The valve assembly of claim 57 wherein the valve member extends along an axis and the first and second surfaces are axially adjacent each other.

59. The valve assembly of claim 58 wherein the bypass passage comprises axially-spaced first and second bores extending into the valve member, the first bore comprising the inlet opening and the second bore comprising the discharge opening.

60. The valve assembly of claim 59 wherein the bypass passage comprises a third bore in the valve member, the third bore intersecting the first and second bores, and the pressure relief valve comprises a valve seat in the third bore between the first and second bores.

61. The valve assembly of claim 60 wherein the third bore is open at an end of the valve member, the pressure relief valve comprises a plug in the third bore sealingly closing the open end of the third bore, and the means for biasing the valving member comprises a spring in the third bore between the plug and the valving member.

62. The valve assembly of claim 61 wherein the spring comprises a compressed length between the plug and the valving member when the valving member is in the closed position, and the plug is adjustably mounted in the third bore for movement towards and away from the valving member for adjustment of the compressed length of the spring.

63. The valve assembly of claim 57 wherein the control valve is of the type having a torsion bar to bias the valve members to a neutral position, the valve member comprising means for attaching the torsion bar to the valve member.

64. The valve assembly of claim 57 wherein the third surface of the valve member comprises at least one flow control surface configured to cooperate with the second valve member to form a variable-flow orifice in the fluid path when the valve member is in the control valve.

65. The valve assembly of claim 64 wherein the outer periphery of the valve member comprises a groove and a land adjacent the groove, the flow control surface on the land.

66. A control valve suitable for controlling a fluid motor having first and second fluid chambers, the valve comprising:
a housing;
an outer valve member and an inner valve member, the inner and outer valve members supported in the housing for relative motion in a first direction from a neutral condition of the control valve and a closed condition of the control valve;
an inlet passage for flowing fluid into the control valve and an exhaust passage for flowing fluid out of the control valve;
the inner and outer valve members arranged to define first and second flow passages between the valve members, the first and second flow passages arranged in parallel and fluidly connecting the inlet passage and the exhaust passage;
the control valve further comprising a first motor passage extending from the first flow passage for flowing fluid between the first flow passage and the first motor chamber, and a second motor passage extending from the second flow passage for flowing fluid between the second flow passage and the second motor chamber;
the inner and outer valve members cooperating to define a pressure orifice, a first exhaust orifice, and a second exhaust orifice in the first and second flow passages, each orifice being variable in flow area in response to motion of the inner valve member in the first direction;
the pressure orifice in the second flow passage between the inlet passage and the second motor passage, the first and second exhaust orifices in series in the first flow passage, the first exhaust orifice between the first motor passage and the exhaust passage, the second exhaust orifice between the first exhaust orifice and the exhaust passage, the first flow path between the first and second exhaust orifices entirely within the housing; and
a flow restriction in the first flow path between the first and second exhaust orifices, the flow restriction configured to reduce the pressure of the fluid discharged from the first exhaust orifice before entering the second exhaust orifice.

67. The hydraulic steering system of claim 66 wherein the inner valve member is rotatable from the centered condition to an off-center condition of the control valve; and the control valve comprises structure defining a flow restriction in the first flow passage between the first and second exhaust orifices when the inner valve member is in the off-center condition;
whereby the pressure of the fluid discharged from the first exhaust orifice is reduced by the flow restriction before entering the second exhaust orifice.

68. The hydraulic steering system of claim 66 wherein the flow restriction comprises at least one additional flow orifice between the first and second exhaust orifices.

69. The hydraulic steering system of claim 68 wherein the at least one additional flow orifice has a fixed flow area.

70. The hydraulic steering system of claim 66 wherein the first and second exhaust orifices each flows fluid in substantially a first direction through the orifice; and the flow restriction structure flows fluid between the first and second exhaust orifices in a second direction substantially different from the first direction to reduce the pressure of the fluid discharged from the first exhaust orifice before it enters the second exhaust orifice.

71. The hydraulic steering system of claim 70 wherein the first direction of flow is substantially circumferential about the axis and the second direction of flow comprises a substantially axial component, substantially radial component, or substantially radial-axial component with respect to the axis.

72. The hydraulic steering system of claim 66 wherein the periphery of each of the inner and outer valve members comprises a plurality of lands, each land having an axial length;
the first exhaust orifice is defined by respective first lands of the inner and outer valve members and the second exhaust orifice is defined by respective second lands of the inner and outer valve members, the first lands comprising a first control edge and the second lands comprising a second control edge, each control edge having an axial dimension substantially less than the axial length of the lands associated with the control edge;
the first lands are circumferentially spaced from each other and the second lands are circumferentially spaced from each other when the control valve is in the centered condition;
the first lands are in an overlapped condition and the second lands are in an overlapped condition when the control valve is in the off-center condition;
the flow restriction structure comprises the outer periphery of the lands being configured to sealing overlap and substantially close the overlap away from the control edges when the control valve is in the off-center condition; and the flow restriction structure comprises axially spacing the first control edge from the second control edge whereby the first flow passage extends axially between the first and second exhaust orifices when the control valve is in the off-center condition.

73. The hydraulic steering system of claim 72 wherein the flow restriction structure comprises a wall substantially closing the first flow passage between the first and second flow orifices when the control valve is in the off-center condition and an additional flow orifice extending through the wall fluidly connecting the first and second exhaust orifices.

74. The hydraulic steering system of claim 73 wherein flow through the additional flow orifice includes an axial flow component, a radial flow component, or a radial-axial flow component with respect to the axis.

75. A method of operating a control valve in a power steering system of a wheeled vehicle, the method comprising the steps of:
(A) supplying working fluid to an inlet passage of the control valve and between inner and outer valve members;
(B) moving the inner valve member relative to the outer valve member, the member, the movement representing movement of the control valve towards a closed condition of the control valve;
(C) flowing fluid through first and second flow passages formed between the valve members, the first and second flow passages arranged in parallel and fluidly connecting the inlet passage with an exhaust passage that exhausts fluid from the control valve;
(D) forming a pressure orifice in the first flow passage in response to relative movement of the inner valve member;
(E) forming a first exhaust orifice and a second exhaust orifice in the second flow passage in response to the relative movement of the inner valve member, the second exhaust orifice downstream from the first exhaust orifice;
(F) flowing fluid to the first flow passage through a first motor passage fluidly connecting the first flow passage to a hydraulic motor, the first motor passage downstream from the pressure orifice;
(G) flowing fluid from the second flow passage through a second motor passage fluidly connecting the second flow passage to the hydraulic motor, the second flow passage upstream from the first exhaust oriface;
(H) closing the first and second exhaust orifaces as the control valve moves from the neutral condition towards the closed condition; and
(I) maintaining the flow area of the second exhaust oriface greater than the flow area of the first exhaust oriface as the inner valve member moves from the neutral conditions towards the closed condition.

76. The method of claim 75 comprising the step of:
(J) fully closing the pressure orifice and the first exhaust orifice when the control valve is in its closed condition, wherein the pressure orifice closes to a fully closed condition substantially before the first exhaust orifice completely closes as the control valve moves to the closed condition.

77. The method of claim 75 comprising the steps of:
(J) moving the inner valve member relative to the outer valve member to a first operating condition of the control valve and moving the inner valve member relative to the outer valve member from the first operating condition to the closed condition;
(K) closing the first exhaust orifice relatively quickly as the control valve moves from the neutral condition to the first operating condition; and
(L) closing the first exhaust orifice relatively slowly as the control valve moves from the first operating condition to the closed condition.

78. The method of claim 77 wherein step (K) comprises the step of closing the first exhaust orifice at a substantially constant first closing rate and step (L) comprises the step of closing the first exhaust orifice at a substantially constant second closing rate.

79. The method of claim 77 comprising the step of:
(M) closing each of the first and second exhaust orifices at a respective substantially constant rate as the control valve moves from the first operating condition to the closed condition.

80. The method of claim 79 wherein the closing rate of the second exhaust orifice is about three times greater than the closing rate of the first exhaust orifice as the control valve moves from the first operating condition to the closed condition.

81. The method of claim 77 wherein the pressure orifice is in essentially a fully closed condition when the control valve is in the first operating condition.

82. The method of claim 75 wherein the second flow passage is essentially without obstructions between the pressure orifice and the exhaust passage as the control valve moves from the neutral condition to the closed condition.

83. The method of claim 75 wherein step (B) comprises relative rotation of the inner valve member with respect to the outer valve member about an axis of rotation.

84. The method of claim 75 wherein said flow paths, said orifices, and said motor passages represent a fluid circuit, and the control valve comprises a plurality of like fluid circuits arranged in parallel fluidly connecting the intake and exhaust passages.

85. The method of claim 84 comprising the step of:
(J) fluidly connecting the portions of the second flow paths extending between the first and second exhaust orifices to equalize the fluid pressure in said portions.

86. The method of claim 75 comprising the step of:
(J) flowing fluid through an additional flow restriction between the first and second exhaust orifices to further reduce the pressure of fluid discharged from the first exhaust orifice prior to the fluid reaching the second exhaust orifice.

* * * * *

UNITED STATES PATENT AND TRADEMARK OFFICE
CERTIFICATE OF CORRECTION

| | | |
|---|---|---|
| PATENT NO. | : 7,152,627 B2 | Page 1 of 2 |
| APPLICATION NO. | : 10/818005 | |
| DATED | : December 26, 2006 | |
| INVENTOR(S) | : Danley et al. | |

It is certified that error appears in the above-identified patent and that said Letters Patent is hereby corrected as shown below:

On the Title Page: (75)

Inventors: replace "Tippton" with --Tipton--.

In the Drawings:

In FIG. 5 add a lead line to reference numeral 104a. As shown in attached.

In the Claims:

Claim 75, Column 27, line 26-29, replace "(B) moving the inner valve member relative to the outer valve member, the member, the movement representing movement of the control valve towards a closed condition of the control valve" with --(B) moving the inner valve member relative to the outer valve member, the movement representing movement of the control valve from a neutral condition towards a closed condition of the control valve--.

Claim 75, Column 27, line 50, replace "oriface" with --orifice--.

Claim 75, Column 27, line 51, replace "oriface" with --orifice--.

Claim 75, Column 27, line 54, replace "oriface" with --orifice--.

Claim 75, Column 27, line 55, replace "oriface" with --orifice--.

Signed and Sealed this

Tenth Day of April, 2007

JON W. DUDAS
*Director of the United States Patent and Trademark Office*